(12) United States Patent
Arai et al.

(10) Patent No.: US 12,348,517 B2
(45) Date of Patent: Jul. 1, 2025

(54) CONTROL SYSTEM, CONTROL APPARATUS, DEVICE CONTROLLING METHOD AND RECORDING MEDIUM

(71) Applicant: Mitsubishi Electric Corporation, Tokyo (JP)

(72) Inventors: Takashi Arai, Tokyo (JP); Saori Okino, Tokyo (JP); Satoko Miki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 319 days.

(21) Appl. No.: 18/043,130

(22) PCT Filed: Nov. 2, 2020

(86) PCT No.: PCT/JP2020/041034
§ 371 (c)(1),
(2) Date: Feb. 27, 2023

(87) PCT Pub. No.: WO2022/091405
PCT Pub. Date: May 5, 2022

(65) Prior Publication Data
US 2023/0308444 A1  Sep. 28, 2023

(51) Int. Cl.
*H04L 9/40* (2022.01)
*H04L 12/28* (2006.01)
*H04L 41/0803* (2022.01)

(52) U.S. Cl.
CPC .......... *H04L 63/10* (2013.01); *H04L 12/2807* (2013.01); *H04L 12/2854* (2013.01); *H04L 41/0803* (2013.01)

(58) Field of Classification Search
CPC . H04L 63/10; H04L 12/2807; H04L 12/2854; H04L 41/0803; H04Q 9/00
See application file for complete search history.

(56) References Cited

U.S. PATENT DOCUMENTS

| 6,938,021 B2* | 8/2005 | Shear ................. G06Q 30/0257 705/67 |
| 10,963,579 B2* | 3/2021 | Lemmey ................. H04L 63/20 |

(Continued)

FOREIGN PATENT DOCUMENTS

| CN | 108427318 A | * | 8/2018 | ............ G05B 15/02 |
| JP | 2015-142199 A | | 8/2015 | |
| WO | 2018/186157 A1 | | 10/2018 | |

OTHER PUBLICATIONS

International Search Report of the International Searching Authority mailed Jan. 19, 2021 for the corresponding International application No. PCT/JP2020/041034 (and English translation).

*Primary Examiner* — Richard G Keehn
(74) *Attorney, Agent, or Firm* — Posz Law Group, PLC

(57) ABSTRACT

A control system includes a cloud server and a terminal device. A checker of the cloud server checks pieces of MAC address data acquired by a machine MAC address acquirer against pieces of MAC address data contained in communicable-machine notification information, and specifies, among the pieces of MAC address data acquired by the machine MAC address acquirer, a piece of MAC address data that matches one of the pieces of MAC address data contained in the communicable-machine notification information. An operation authority setter generates, based on the piece of MAC address data specified by the checker, operation authority information containing a piece of MAC address data on a machine operable via the terminal device.

19 Claims, 15 Drawing Sheets

(56) References Cited

U.S. PATENT DOCUMENTS

| | | | |
|---|---|---|---|
| 2013/0044878 A1* | 2/2013 | Rich | H04L 9/083 380/277 |
| 2015/0324563 A1* | 11/2015 | Deutschmann | G06F 16/285 726/7 |
| 2016/0005266 A1* | 1/2016 | Kawashima | E05B 65/0003 463/20 |
| 2016/0127858 A1* | 5/2016 | Brockhaus | H04W 4/80 455/41.1 |
| 2016/0212131 A1* | 7/2016 | Nishida | H04L 63/10 |
| 2017/0205783 A1* | 7/2017 | Tannenbaum | G05B 15/02 |
| 2019/0312867 A1 | 10/2019 | Nakamura | |
| 2020/0244442 A1* | 7/2020 | Zeh | H04L 9/3242 |

\* cited by examiner

FIG. 4

OPERATION AUTHORITY STORAGE 133

| MAC ADDRESS DATA | USER IDENTIFICATION DATA |
|---|---|
| MAC[0, 0] | IDU[0] |
| MAC[0, 1] | IDU[0] |
| ⋮ | ⋮ |
| MAC[1, 0] | IDU[1] |
| MAC[2, 0] | IDU[1] |
| ⋮ | ⋮ |
| MAC[1, 1] | IDU[2] |
| MAC[2, 1] | IDU[2] |
| ⋮ | ⋮ |

FIG. 8

MACHINE ID STORAGE 2132

| MODEL NUMBER DATA | MAC ADDRESS DATA | IP ADDRESS DATA (PRIVATE IP ADDRESS) | IP ADDRESS DATA (GLOBAL IP ADDRESS) |
|---|---|---|---|
| SEN[0, 0] | MAC[0, 0] | LIP[0, 0] | GIP[0] |
| SEN[0, 1] | MAC[0, 1] | LIP[0, 1] | GIP[0] |
| SEN[0, 2] | MAC[0, 2] | LIP[0, 2] | GIP[0] |
| ⋮ | ⋮ | ⋮ | ⋮ |

CONTROL SYSTEM, CONTROL APPARATUS, DEVICE CONTROLLING METHOD AND RECORDING MEDIUM

CROSS-REFERENCE TO RELATED APPLICATION

This application is a U.S. National Stage Application of International Patent Application No. PCT/JP2020/041034 filed on Nov. 2, 2020, the contents of which are incorporated herein by reference.

TECHNICAL FIELD

The present disclosure relates to a control system, a control device, a method of controlling machines, and a program.

BACKGROUND

Device control apparatuses have been proposed that control network compatible home appliances by receiving device control data on the network compatible home appliances from a controller and transmitting the device control data to the network compatible home appliances on the basis of the operation right indicating whether a user can control the network compatible home appliances (for example, refer to Patent Literature 1). Such a device control apparatus also grants the authorization right, in addition to the operation right, and thereby allows a user having the authorization right to set the operation right. The setting of the operation right can thus be changed by multiple users having the authorization right and can be flexibly managed.

PATENT LITERATURE

Patent Literature 1: Unexamined Japanese Patent Application Publication No. 2015-142199

Unfortunately, in the device control apparatus disclosed in Patent Literature 1, even a person other than the owner of electric devices is allowed to arbitrarily change the setting of the operation right for the electric devices belonging to the owner, if the person has the authorization right. When the authorization right is acquired by a person other than the owner of the electric devices, the person may execute operations deviating from the owner's intension on the electric devices from a place distant from the electric devices.

SUMMARY

An objective of the present disclosure, which has been accomplished in view of the above situations, is to provide a control system, a control device, a method of controlling machines, and a program that can prevent machines from being subject to operations deviating from the owner's intension in a place distant from the machines.

To achieve the above objective, a control system according to the present disclosure includes a terminal device capable of communicating with one or more machines via a local network, and a control device capable of communicating with the one or more machines and the terminal device via a wide area network and configured to control the one or more machines based on operation information transmitted from the terminal device. The terminal device includes a first machine ID acquirer to acquire, from each of the one or more machines via the local network, a piece of first machine identification data identifying the machine in the local network, and a communicable machine notifier to (i) generate communicable-machine notification information containing one or more pieces of the first machine identification data on, among the one or more machines, one or more machines that are communicable with the terminal device via the local network, and (ii) transmit the generated communicable-machine notification information to the control device. The control device includes a second machine ID acquirer to acquire, from the one or more machines via the wide area network, one or more pieces of the first machine identification data on the one or more machines, a communicable-machine notification information acquirer to acquire the communicable-machine notification information from the terminal device via the wide area network, a checker to check the one or more pieces of the first machine identification data acquired by the second machine ID acquirer against the one or more pieces of the first machine identification data contained in the communicable-machine notification information, and specify, among the one or more pieces of the first machine identification data acquired by the second machine ID acquirer, a piece of the first machine identification data that matches one piece of the one or more pieces of the first machine identification data contained in the communicable-machine notification information, and an operation authority setter to generate, based on the piece of the first machine identification data specified by the checker, operation authority information containing the piece of the first machine identification data on a machine operable via the terminal device.

According to the present disclosure, the checker checks the one or more pieces of the first machine identification data acquired from the one or more machines against the one or more pieces of the first machine identification data contained in the communicable-machine notification information acquired from the terminal device, and specifies, among the one or more pieces of the first machine identification data acquired from the one or more machines, a piece of the first machine identification data that matches one piece of the one or more pieces of the first machine identification data contained in the communicable-machine notification information. The operation authority setter then generates operation authority information containing the piece of the first machine identification data on a machine operable via the terminal device, based on the piece of the first machine identification data specified by the checker. This configuration allows only machines that are communicable with the terminal device via the local network to be set as the machines operable via the terminal device. The configuration can thus prevent the machines from being operated via a terminal device not connected to the local network, for example. The configuration can therefore prevent the machines from being subject to operations deviating from the owner's intension via a terminal device not connected to the local network in a place distant from the machines, for example.

BRIEF DESCRIPTION OF DRAWINGS

FIG. 4 illustrates an example of information stored in an operation authority storage according to Embodiment 1;

FIG. 8 illustrates an example of information stored in a machine ID storage according to Embodiment 2;

DETAILED DESCRIPTION

Embodiment 1

A control system according to embodiments of the present disclosure is described below with reference to the accompanying drawings. A control system according to the present embodiment includes a terminal device capable of communicating with one or more machines via a local network, and a control device capable of communicating with the one or more machines and the terminal device via a wide area network and configured to control the one or more machines on the basis of operation information transmitted from the terminal device. The terminal device includes a first machine ID acquirer and a communicable machine notifier. The first machine ID acquirer acquires, from each of the one or more machines via the local network, a piece of first machine identification data identifying the machine in the local network. The communicable machine notifier generates communicable-machine notification information containing one or more pieces of the first machine identification data on, among the one or more machines, one or more machines that are communicable with the terminal device via the local network, and transmits the generated communicable-machine notification information to the control device. The control device includes a second machine ID acquirer, a communicable-machine notification information acquirer, a checker, and an operation authority setter. The second machine ID acquirer acquires, from the one or more machines via the wide area network, one or more pieces of the first machine identification data on the one or more machines. The communicable-machine notification information acquirer acquires the communicable-machine notification information from the terminal device via the wide area network. The checker checks the one or more pieces of the first machine identification data acquired by the second machine ID acquirer against the one or more pieces of the first machine identification data contained in the communicable-machine notification information, and specifies, among the one or more pieces of the first machine identification data acquired by the second machine ID acquirer, a piece of the first machine identification data that matches one piece of the one or more pieces of the first machine identification data contained in the communicable-machine notification information. The operation authority setter generates, on the basis of the piece of the first machine identification data specified by the checker, operation authority information containing the piece of the first machine identification data on a machine operable via the terminal device.

Figure 1:
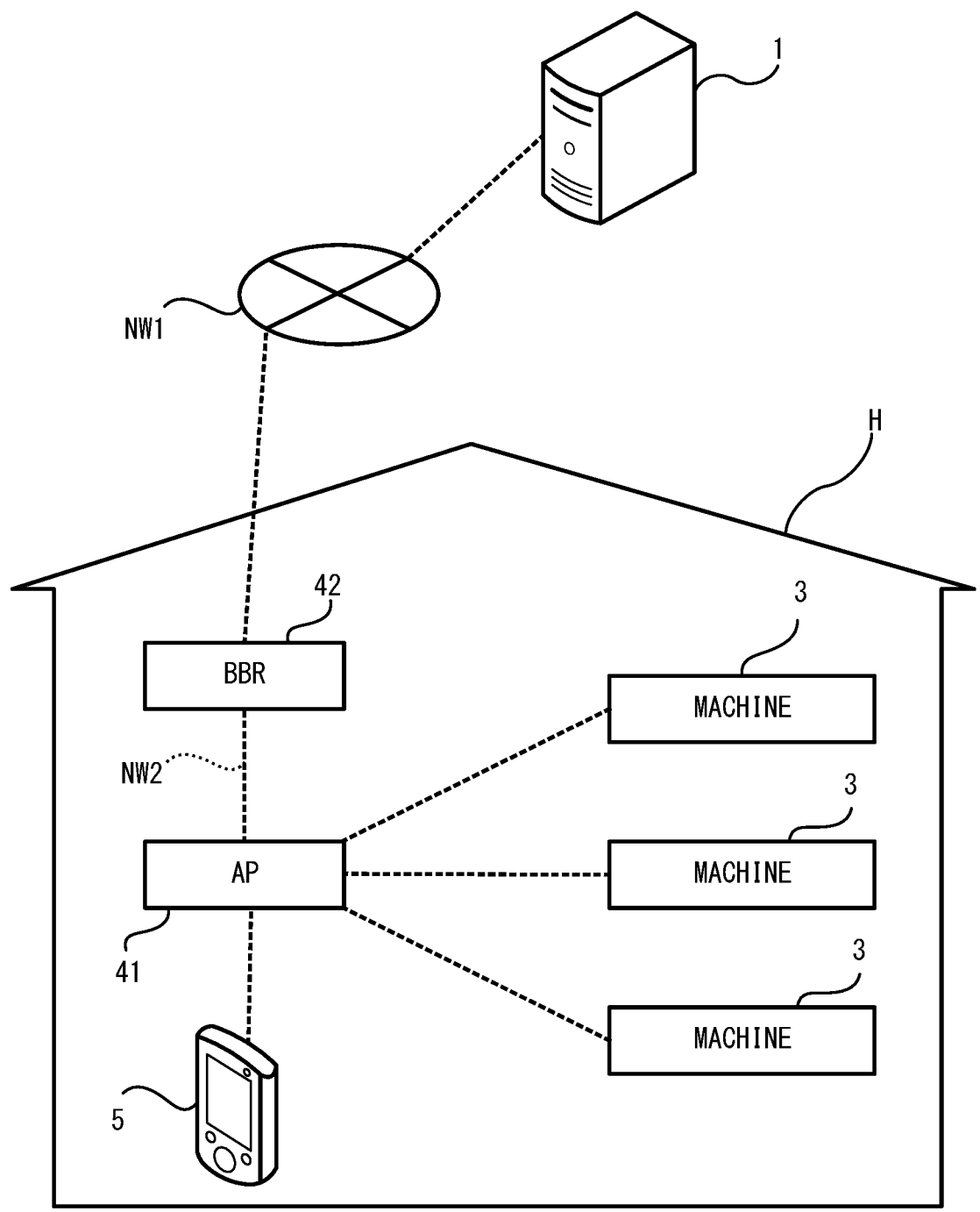
FIG. 1 illustrates a schematic configuration of a control system according to Embodiment 1 of the present disclosure.

As illustrated in FIG. 1, the control system according to the present embodiment includes a cloud server 1 to control multiple machines 3 installed inside a building H and a terminal device 5. The machines 3 are connected to a wireless local area network (LAN) established by an access point 41 installed inside the building H. The access point 41 communicates with a broadband router (hereinafter referred to as "BBR") 42 via a local network NW2, such as wired LAN. The cloud server 1 and the terminal device 5 are connected to a wide area network NW1, such as the Internet.

Figure 2:
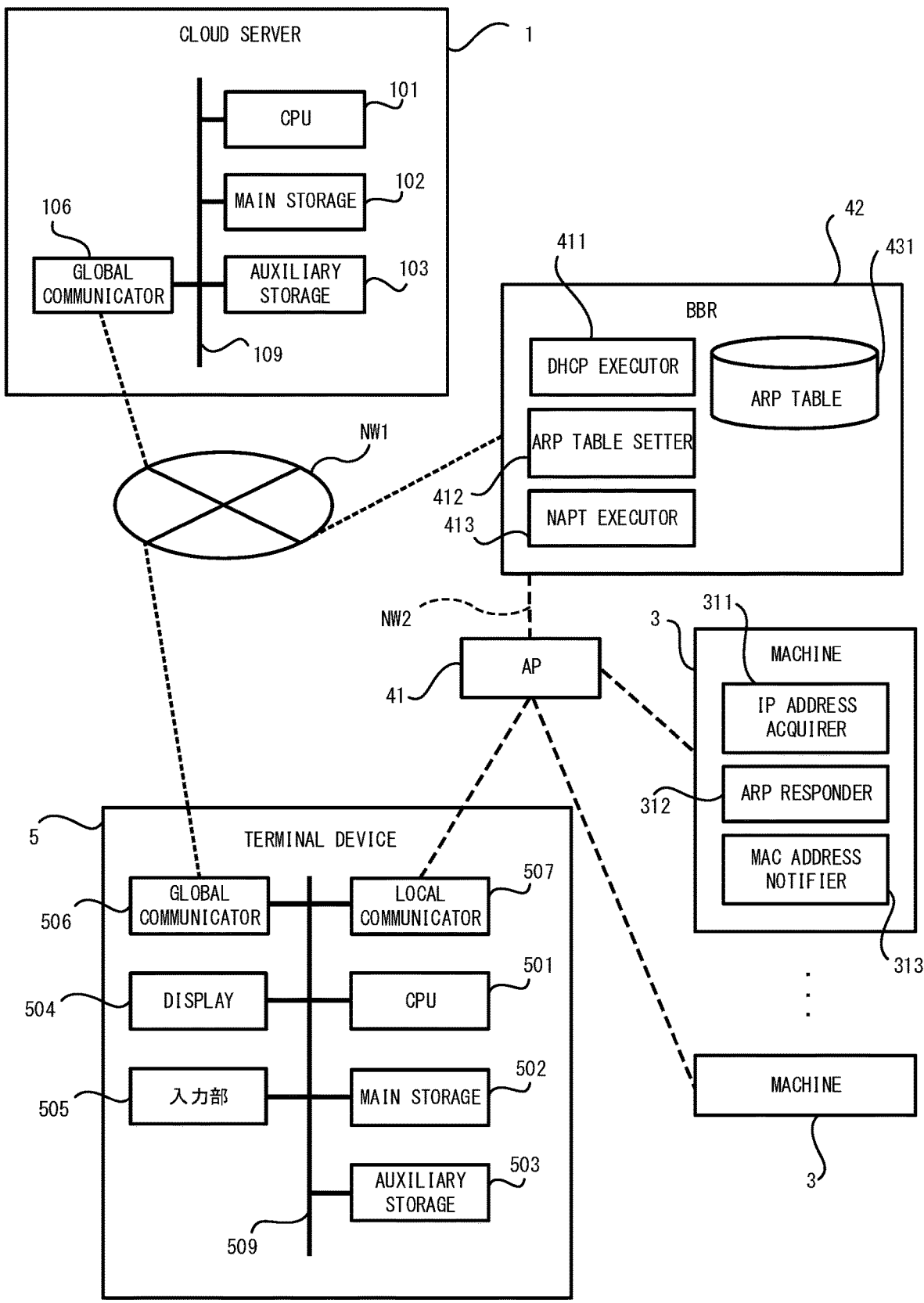
FIG. 2 is a block diagram illustrating hardware components of the control system according to Embodiment 1.

Examples of the machines 3 include air-conditioning apparatuses, lighting apparatuses, and rice cookers. Each of the machines 3 includes a wireless module for wireless communication with the access point 41. As illustrated in FIG. 2, each of the machines 3 includes an internet protocol (IP) address acquirer 311, an address resolution protocol (ARP) responder 312, and a medium access control (MAC) address notifier 313. The IP address acquirer 311 transmits, to the BBR 42, connection request information for requesting the BBR 42 to assign an IP address when the machine 3 is connected to the local network NW2, and thereby acquires a piece of IP address data indicating the IP address assigned to the machine 3 itself. The ARP responder 312, when acquiring ARP request information from the terminal device 5 via the local network NW2, transmits, to the terminal device 5, ARP response information containing a piece of MAC address data indicating the MAC address of the machine 3 itself, which is a piece of first machine identification data, and the piece of IP address data indicating the IP address assigned to the machine 3 itself. The MAC address notifier 313 generates a piece of MAC address data indicating the MAC address of the machine 3 itself and transmits the generated piece of MAC address data to the cloud server 1 via the local network NW2, the BBR 42, and the wide area network NW1, at the time of activation of the machine 3. Specifically, the MAC address notifier 313 generates a piece of MAC address data, in which the private IP address of the machine 3 itself is set as the source IP address of the header and the MAC address of the machine 3 itself is contained in the payload, and transmits the generated piece of MAC address data to the BBR 42. When the BBR 42 acquires the piece of MAC address data, a network address port translation (NAPT) executor 413 converts the source IP address of the header into the global IP address corresponding to the source machine 3. The BBR 42 then transmits the piece of MAC address data after conversion of the source IP address to the cloud server 1.

The access point 41 includes a signal generating circuit and an antenna, and a wireless module for wireless communication with the machines 3. The access point 41 executes communication using a communication protocol comprising IEEE802.11a, b, g, n, or the like, in a data link layer. The BBR 42 includes a non-illustrated processor, a non-illustrated memory, a non-illustrated global communicator connected to the wide area network NW1, and a non-illustrated local communicator connected to the local network NW2. The memory is a non-volatile memory, such as semiconductor memory, and stores programs for performing various functions of the BBR 42. The local communicator is connected to the access point 41 via the local network NW2. The local communicator includes a communication interface for communication with the access point 41, for example. The communication interface executes communication using a communication protocol comprising the Ethernet or the like in a data link layer. The memory stores an ARP table 431, as illustrated in FIG. 2. The processor executes the programs stored in the memory, and thereby functions as a dynamic host configuration protocol (DHCP) executor 411, an ARP table setter 412, and the NAPT executor 413.

The DHCP executor 411, when receiving connection request information from the machine 3 or the terminal device 5, specifies an IP address to be assigned to the source machine 3 or the terminal device 5 that has transmitted the connection request information, from the preset multiple IP addresses. The DHCP executor 411 then transmits a piece of IP address data indicating the specified IP address to the source machine 3 or the terminal device 5. The ARP table setter 412 transmits ARP request information to the machines 3 and the terminal device 5, and thereby acquires ARP response information containing pieces of IP address data and pieces of MAC address data from the machines 3 and the terminal device 5. The ARP table setter 412 then extracts the pieces of IP address data and the pieces of MAC address data from the acquired ARP response information, and causes the pieces of IP address data and the pieces of MAC address data to be registered into the ARP table 431 in association with each other. The NAPT executor 413, when acquiring various types of information directed to the machine 3 or the terminal device 5 via the wide area network NW1, converts the global IP addresses of the acquired information into private IP addresses and then outputs the information to the local network NW2. Also, the NAPT executor 413, when acquiring various types of information directed to the cloud server 1 via the local network NW2, converts the private IP addresses of the acquired information into global IP addresses and then outputs the information to the wide area network NW1. That is, the private IP address information assigned to the respective machines 3 are not contained in pieces of MAC address data output to the wide area network NW1. This configuration can ensure the confidence of the private IP addresses.

A typical example of the terminal device 5 is a smartphone. As illustrated in FIG. 2, the terminal device 5 includes a central processing unit (CPU) 501, a main storage 502, an auxiliary storage 503, a display 504, an inputter 505, a global communicator 506, a local communicator 507, and buses 509 for connecting these components to each other. The main storage 502 includes a volatile memory, such as random access memory (RAM), and serves as a work area for the CPU 501. The auxiliary storage 503 is a non-volatile memory, such as semiconductor flash memory, and stores programs for allowing the CPU 501 to execute various processes. The display 504 is a display device, such as liquid crystal display or organic electroluminescence (EL) display. The inputter 505 is a transparent touch pad overlaid on the display 504, for example. The global communicator 506 is connected to the wide area network NW1. The global communicator 506 transmits information transferred from the CPU 501 to the cloud server 1 via the wide area network NW1, and transfers information received from the cloud server 1 via the wide area network NW1 to the CPU 501.

The local communicator 507 is connected to the local network NW2. The local communicator 507 transmits information transferred from the CPU 501 to the BBR 42 via the local network NW2, and transfers information received from the BBR 42 via the local network NW2 to the CPU 501.

Figure 3:
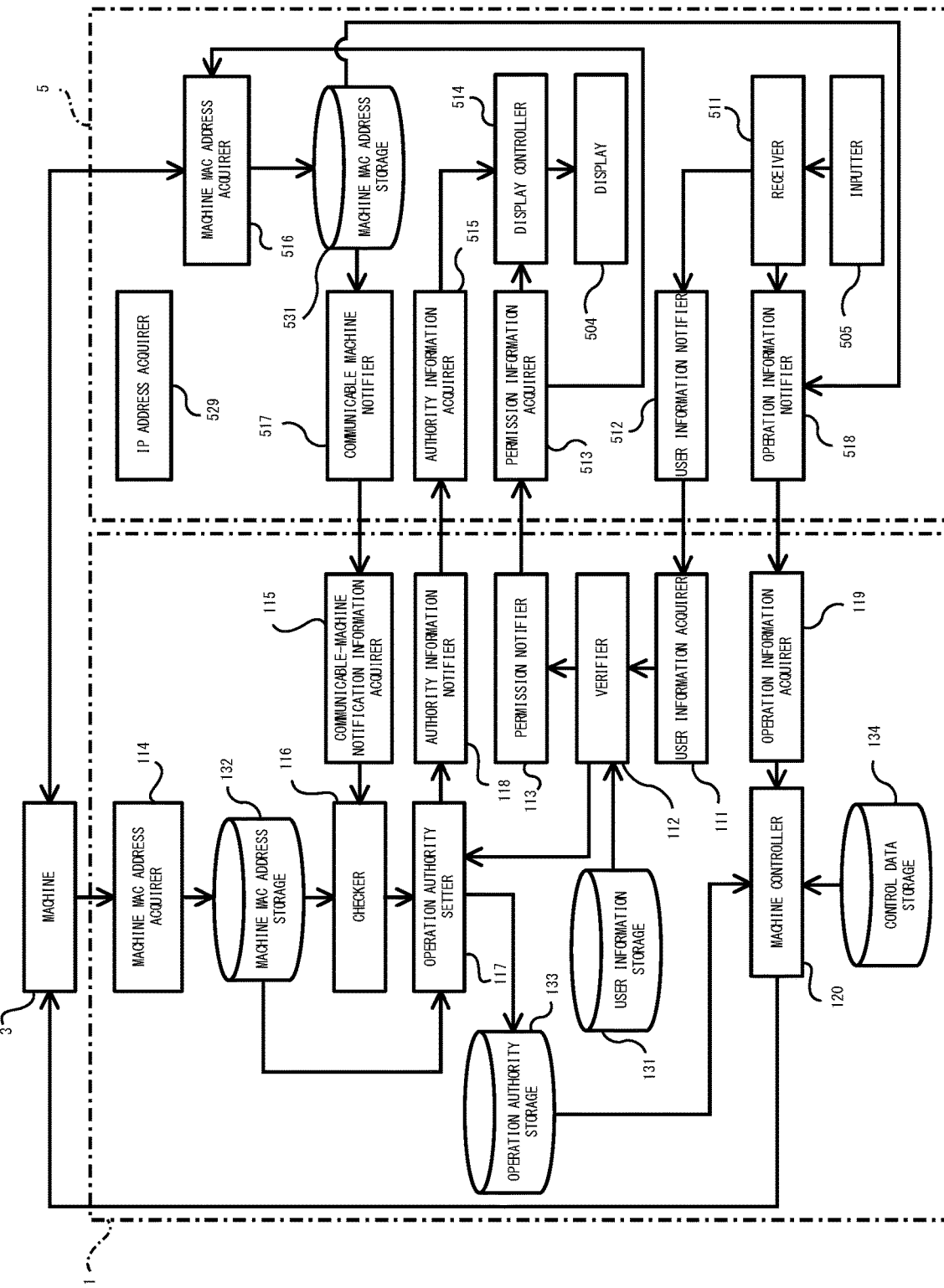
FIG. 3 is a block diagram illustrating a functional configuration of the control system according to Embodiment 1.

The CPU 501 loads the programs stored in the auxiliary storage 503 into the main storage 502 and executes the programs, and thereby functions as a receiver 511, a user information notifier 512, a permission information acquirer 513, a display controller 514, an authority information acquirer 515, a machine MAC address acquirer 516, a communicable machine notifier 517, an operation information notifier 518, and an IP address acquirer 529, as illustrated in FIG. 3. The auxiliary storage 503 illustrated in FIG. 2 includes a machine MAC address storage 531, as illustrated in FIG. 3. The machine MAC address storage 531 stores pieces of MAC address data on the respective machines 3.

The receiver 511 receives the content of an operation that the user executes on the inputter 505. When the user executes an operation on the inputter 505 for user registration regarding the machines 3, the receiver 511 receives a piece of user identification data and a piece of password data that the user inputs during the operation for user registration, and notifies the user information notifier 512 of the received piece of user identification data and piece of password data. When the user executes an operation on the inputter 505 for controlling one of the machines 3, such as an operation for activating or deactivating the machine 3 or an operation for varying the operational setting of the machine 3, the receiver 511 receives information indicating the content of the operation executed by the user, and notifies the operation information notifier 518 of the received information.

The user information notifier 512, when being notified by the receiver 511 of the piece of user identification data and the piece of password data, generates user information containing the provided piece of user identification data and piece of password data, and transmits the generated user information to the cloud server 1. The permission information acquirer 513, when acquiring from the cloud server 1 permission information indicating permission to use the machines 3, notifies the machine MAC address acquirer 516 and the display controller 514 of the acquired permission information. The authority information acquirer 515, when acquiring authority information from the cloud server 1 for notifying the user that the operation authority of the machines 3 is granted to the user, notifies the display controller 514 of the acquired authority information.

The display controller 514, when being notified by the permission information acquirer 513 of the permission information, causes the display 504 to display message information for notifying the user that the user can use the machines 3. The display controller 514, when being notified by the authority information acquirer 515 of the authority information, causes the display 504 to display message information for notifying the user that the operation authority of the machines 3 is granted to the user.

The machine MAC address acquirer 516 is a first machine ID acquirer to transmit ARP request information to the machines 3 and thereby acquire ARP response information containing pieces of IP address data and pieces of MAC address data from the machines 3. The machine MAC address acquirer 516, when being notified by the permission information acquirer 513 of the permission information, transmits ARP request information to the machines 3 and thereby acquires ARP response information from the machines 3. The machine MAC address acquirer 516 then extracts the pieces of MAC address data from the acquired ARP response information, and causes the extracted pieces of MAC address data to be stored into the machine MAC address storage 531. Alternatively, the machine MAC address acquirer 516 may acquire, from the BBR 42, pieces of MAC address data on the respective machines 3 stored in the ARP table 431 of the BBR 42.

The communicable machine notifier 517 generates communicable-machine notification information containing pieces of MAC address data on the respective machines 3 communicable via the local network NW2, and transmits the generated communicable-machine notification information to the cloud server 1. Specifically, the communicable machine notifier 517 acquires the pieces of MAC address data on the respective machines 3 stored in the machine MAC address storage 531, and generates communicable-machine notification information containing the acquired pieces of MAC address data.

The operation information notifier 518, when being notified by the receiver 511 of the information indicating the content of the operation executed by the user on the inputter 505, generates operation information containing the provided information. The operation information notifier 518 then transmits the generated operation information to the cloud server 1. The IP address acquirer 529 transmits, to the BBR 42, connection request information for requesting the BBR 42 to assign an IP address when the terminal device 5 is connected to the local network NW2, and thereby acquires a piece of IP address data indicating the IP address assigned to the terminal device 5.

The cloud server 1 is connected to the machines 3 via the BBR 42 and the wide area network NW1, and serves as a control device for controlling the machines 3. As illustrated in FIG. 2, the cloud server 1 includes a CPU 101, a main storage 102, an auxiliary storage 103, a global communicator 106, and buses 109 for connecting these components to each other. A typical example of the CPU 101 is a multi-core processor. The main storage 102 is a volatile memory and serves as a work area for the CPU 101. The auxiliary storage 103 includes a non-volatile memory and serves as a ROM or storage. The auxiliary storage 103 stores programs for performing various functions of the cloud server 1. The global communicator 106 communicates with the machines 3 via the wide area network NW1 and the BBR 42, and communicates with the terminal device 5 via the wide area network NW1.

The CPU 101 loads the programs stored in the auxiliary storage 103 into the main storage 102 and executes the programs, and thereby functions as a user information acquirer 111, a verifier 112, a permission notifier 113, a machine MAC address acquirer 114, a communicable-machine notification information acquirer 115, a checker 116, an operation authority setter 117, an authority information notifier 118, an operation information acquirer 119, and a machine controller 120, as illustrated in FIG. 3. The auxiliary storage 103 illustrated in FIG. 2 includes a user information storage 131, a machine MAC address storage 132, an operation authority storage 133, and a control data storage 134, as illustrated in FIG. 3. The user information storage 131 stores pieces of user identification data and pieces of password data on the preliminarily registered users in association with each other. Specifically, a user activates, at the terminal device 5, an application for registration of user information into the cloud server 1, and executes an operation for registering the piece of user identification data and the piece of password data on the user himself or herself into the cloud server 1 via the inputter 505 in advance, for example. The user can thereby cause the piece of user identification data and the piece of password data to be stored into the user information storage 131.

The machine MAC address storage 132 stores pieces of MAC address data on the machines 3. The operation authority storage 133 stores pieces of MAC address data on the respective machines 3 in association with pieces of user identification data on users who have the operation authority of the respective machines 3, for example, as illustrated in FIG. 4. Each piece of MAC address data on the machine 3 is associated with only a single piece of user identification data. Referring back to FIG. 3, the control data storage 134 stores pieces of control data for controlling the respective machines 3 in association with combinations of the pieces of MAC address data on the respective machines 3 and pieces of data indicating the contents of operations.

The user information acquirer 111, when acquiring user information transmitted from the terminal device 5, notifies the verifier 112 of the acquired user information. The verifier 112 executes a process for verifying the user on the basis of the user information provided from the user information acquirer 111. Specifically, the verifier 112 extracts the piece of user identification data and the piece of password data from the user information, and determines whether the extracted combination of the user identification data and the password data matches any of the combinations stored in the user information storage 131. When the combination of the user identification data and the password data extracted from the user information matches any of the combinations stored in the user information storage 131, the verifier 112 determines the verification to be successful. In contrast, when the extracted combination does not match any of the combinations stored in the user information storage 131, the verifier 112 determines the verification to be unsuccessful. The verifier 112, upon success of the verification based on the user information, notifies the operation authority setter 117 of the piece of user identification data contained in this user information. Upon success of the verification by the verifier 112, the permission notifier 113 transmits to the terminal device 5 permission information for notifying the user that the user is permitted to use the machines 3.

The machine MAC address acquirer 114 serves as a second machine ID acquirer to acquire, from each of the machines 3 via the wide area network NW1, an MAC address of the machine 3. The machine MAC address acquirer 114 acquires pieces of MAC address data transmitted from the respective machines 3 directly to the cloud server 1, and causes the acquired pieces of MAC address data to be stored into the machine MAC address storage 132. The communicable-machine notification information acquirer 115 acquires communicable-machine notification information from the terminal device 5 via the wide area network NW1. The communicable-machine notification information acquirer 115 extracts pieces of MAC address data on the machines 3 from the acquired communicable-machine notification information, and notifies the checker 116 of the extracted pieces of MAC address data.

The checker 116 checks the pieces of MAC address data, acquired by the machine MAC address acquirer 114 and stored in the machine MAC address storage 132, against the pieces of MAC address data provided from the communicable-machine notification information acquirer 115. The checker 116 then specifies, among the pieces of MAC address data acquired by the machine MAC address acquirer 114, a piece of MAC address data that matches one piece of the pieces of MAC address data provided from the communicable-machine notification information acquirer 115.

The operation authority setter 117 generates operation authority information containing the piece of MAC address data on the machine 3 operable via the terminal device 5 and the piece of user identification data provided from the verifier 112, on the basis of the piece of MAC address data specified by the checker 116. The operation authority setter 117 then causes the generated operation authority information to be stored into the operation authority storage 133 and notifies the authority information notifier 118 of the operation authority information. In the case where the operation authority storage 133 preliminarily stores pieces of MAC address data on the respective machines 3 in association with pieces of user identification data, the operation authority setter 117 updates the piece of user identification data associated with the piece of MAC address data on the machine 3 corresponding to the current operation authority information, to the current piece of user identification data. The operation authority setter 117 thereby maintains each of the pieces of MAC address data on the machines 3 to be always associated with a single piece of user identification data. The authority information notifier 118, when being notified by the operation authority setter 117 of the operation authority information, transmits authority information for notifying the user that the operation authority is granted to the user, to the source terminal device 5 that has transmitted the user information.

The operation information acquirer 119 acquires operation information transmitted from the terminal device 5, and notifies the machine controller 120 of the acquired operation information. The machine controller 120, when being notified of the operation information, extracts a piece of user identification data and a piece of MAC address data on the machine 3 from the operation information, and determines whether the user has the operation authority on the basis of the extracted piece of user identification data and piece of MAC address data. Specifically, the machine controller 120 determines whether the operation authority information corresponding to the combination of the user identification data and the MAC address data extracted from the operation information is stored in the operation authority storage 133. When the operation authority information corresponding to the combination of the user identification data and the MAC address data extracted from the operation information is stored in the operation authority storage 133, the machine controller 120 determines that the user has the operation authority. The machine controller 120, when determining that the user has the operation authority, selects a piece of control data corresponding to the operation information from the pieces of control data stored in the control data storage 134, and transmits the selected piece of control data to the machine 3 corresponding to the operation information via the wide area network NW1.

Figure 5:
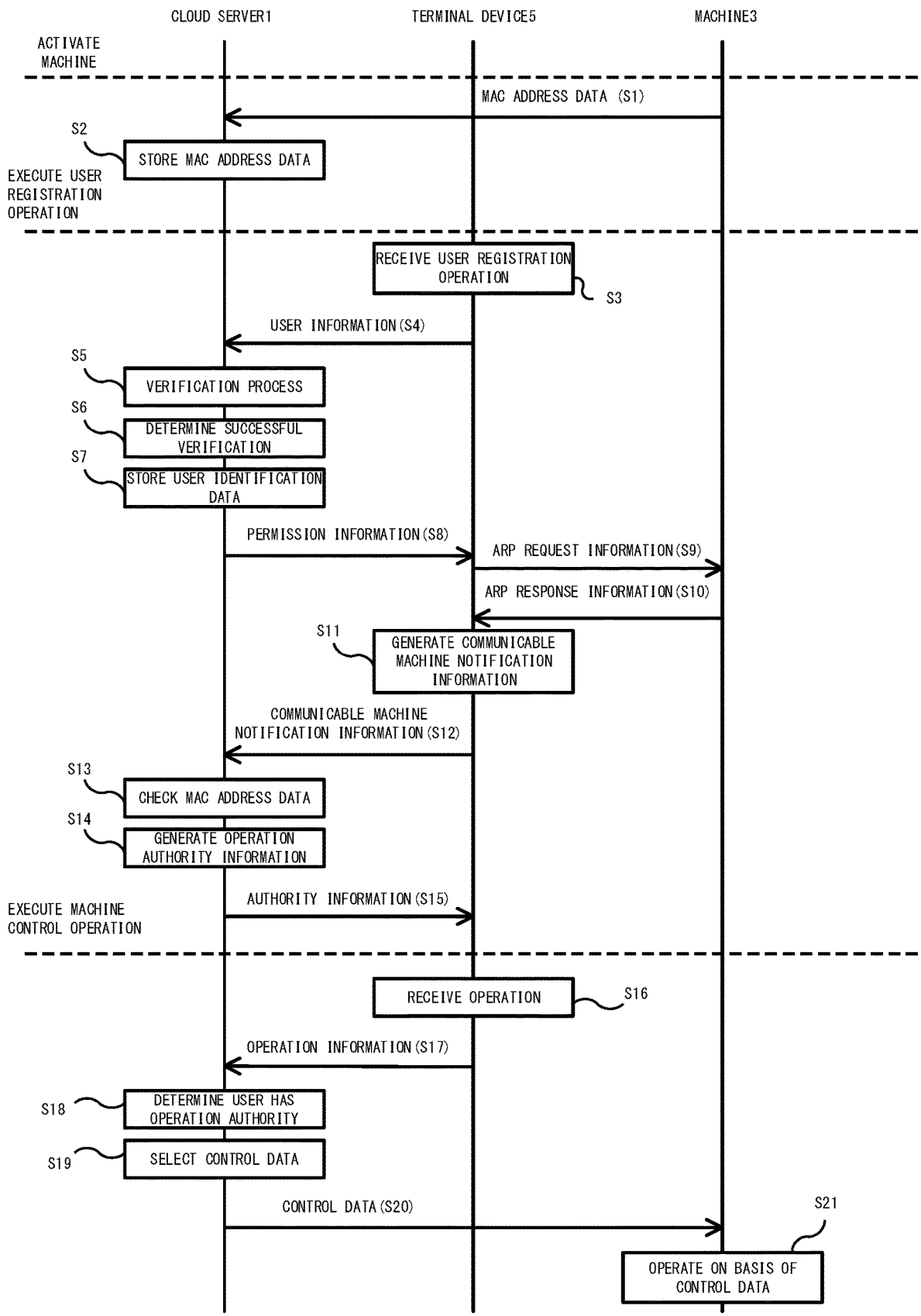
FIG. 5 is a sequence diagram illustrating an operation of the control system according to Embodiment 1.

An operation of the control system according to the present embodiment is described below with reference to FIG. 5. First, the machine 3, when being activated, transmits a piece of MAC address data indicating the MAC address of the machine 3 to the cloud server 1 (step S1). The cloud server 1, when acquiring the piece of MAC address data, causes the acquired piece of MAC address data to be stored into the machine MAC address storage 132 (step S2).

The following description assumes an exemplary case where the user executes a user registration operation via the inputter 505 of the terminal device 5. In this case, the terminal device 5 receives the user registration operation (step S3), and transmits the corresponding user information to the cloud server 1 (step S4). The cloud server 1, when acquiring the user information, executes a process for verifying the user on the basis of the acquired user information (step S5). When the cloud server 1 determines the verification to be successful (step S6), the cloud server 1 causes the piece of user identification data contained in the user information to be stored into the operation authority storage 133 (step S7). The cloud server 1 then transmits the above-mentioned permission information to the terminal device 5 (step S8). The terminal device 5, when acquiring the permission information, causes the display 504 to display message information for notifying the user that the user can use the machines 3.

The terminal device 5, when acquiring the permission information from the cloud server 1, also transmits ARP request information to the machines 3 (step S9). The machines 3, when acquiring the ARP request information, transmit ARP response information to the terminal device 5 (step S10). The terminal device 5 then extracts pieces of MAC address data contained in the ARP response information acquired from the machines 3, and causes the extracted pieces of MAC address data to be stored into the machine MAC address storage 531. The terminal device 5 then generates communicable-machine notification information containing the pieces of MAC address data on the machines 3 and stored in the machine MAC address storage 531 (step S11). The terminal device 5 then transmits the generated communicable-machine notification information to the cloud server 1 (step S12).

The cloud server 1, when acquiring the communicable-machine notification information from the terminal device 5, checks the pieces of MAC address data that the cloud server 1 acquires directly from the machine 3 and that are stored in the machine MAC address storage 132, against the pieces of MAC address data contained in the communicable-machine notification information (step S13). The cloud server 1 then specifies, among the pieces of MAC address data stored in the machine MAC address storage 132, a piece of MAC address data that matches one piece of the pieces of MAC address data contained in the communicable-machine notification information. The cloud server 1 then generates operation authority information containing the piece of MAC address data on the machine 3 operable via the terminal device 5 and the piece of user identification data contained in the user information acquired from the terminal device 5, on the basis of the specified piece of MAC address data (step S14). The cloud server 1 then causes the generated operation authority information to be stored into the operation authority storage 133. The cloud server 1 also transmits the above-mentioned authority information to the terminal device 5 (step S15). The terminal device 5, when acquiring the authority information, causes the display 504 to display message information for notifying the user that the operation authority of the machine 3 is granted to the user.

In an exemplary case where the user executes an operation for controlling one of the machines 3 on the inputter 505 of the terminal device 5, the terminal device 5 receives the operation that the user executes on the inputter 505 (step S16). The terminal device 5 then transmits, to the cloud server 1, operation information indicating the operation received at the terminal device 5 (step S17). The cloud server 1, when acquiring the operation information from the terminal device 5, extracts a piece of user identification data and a piece of MAC address data on the machine 3 from the operation information, and determines that the user has the operation authority on the basis of the extracted piece of user identification data and piece of MAC address data (step S18). In this case, the cloud server 1 selects a piece of control data corresponding to the operation information from the pieces of control data stored in the control data storage 134 (step S19). The cloud server 1 then transmits the selected piece of control data to the machine 3 (step S20). The machine 3, when acquiring the piece of control data from the cloud server 1, operates on the basis of the acquired piece of control data (step S21).

Figure 6:
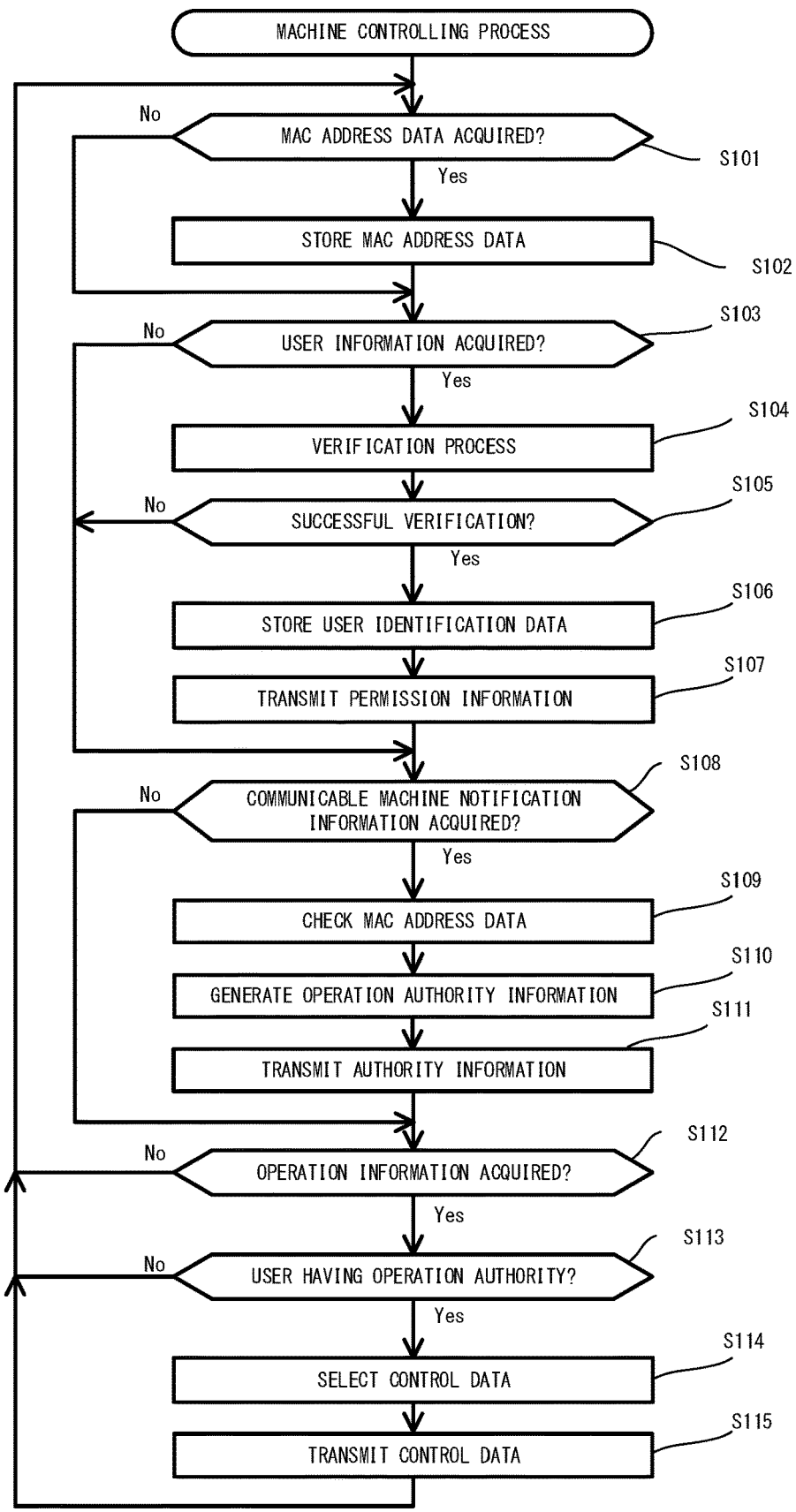
FIG. 6 is a flowchart illustrating an example of a machine controlling process executed in a cloud server according to Embodiment 1.

The cloud server 1 according to the present embodiment executes a machine controlling process, which is described below with reference to FIG. 6. This machine controlling process is started in response to activation of a program for executing the machine controlling process in the cloud server 1. First, the machine MAC address acquirer 114 determines whether a piece of MAC address data is acquired from the machine 3 (step S101). When the machine MAC address acquirer 114 determines that no MAC address data is received from the machine 3 (NO in step S101), the process goes to step S103 described below. In contrast, when the machine MAC address acquirer 114 determines that a piece of MAC address data is acquired from the machine 3 (YES in step S101), the machine MAC address acquirer 114 causes the acquired piece of MAC address data to be stored into the machine MAC address storage 132 (step S102). The user information acquirer 111 then determines whether user information is acquired from the terminal device 5 (step S103). When the user information acquirer 111 determines that no user information is acquired from the terminal device 5 (NO in step S103), the process goes to step S108 described below.

In contrast, when the user information acquirer 111 determines that user information is acquired from the terminal device 5 (YES in step S103), the verifier 112 executes a process for verifying the user on the basis of the user information acquired by the user information acquirer 111 (step S104). Specifically, the verifier 112 extracts a piece of user identification data and a piece of password data from the user information, and determines whether the extracted combination of the user identification data and the password data matches any of the combinations stored in the user information storage 131. The verifier 112 then determines whether the verification based on the user information is successful (step S105). When the verifier 112 determines the verification to be unsuccessful (NO in step S105), the process goes to step S108 described below. In contrast, when the verifier 112 determines the verification to be successful (YES in step S105), the verifier 112 notifies the operation authority setter 117 of the piece of user identification data contained in the user information applied to the verification. The operation authority setter 117 then causes the piece of user identification data provided from the verifier 112 to be stored into the operation authority storage 133 (step S106). The permission notifier 113 then transmits, to the terminal device 5, permission information for notifying the user that the user is permitted to use the machines 3 (step S107).

The communicable-machine notification information acquirer 115 then determines whether communicable-machine notification information is acquired from the terminal device 5 (step S108). When the communicable-machine notification information acquirer 115 determines that no communicable-machine notification information is acquired (NO in step S108), the process goes to step S112 described below. In contrast, when the communicable-machine notification information acquirer 115 determines that communicable-machine notification information is acquired (YES in step S108), the communicable-machine notification information acquirer 115 extracts the pieces of MAC address data on the machines 3 from the acquired communicable-machine notification information, and notifies the checker 116 of the extracted pieces of MAC address data.

The checker 116 then checks the pieces of MAC address data acquired by the machine MAC address acquirer 114 against the pieces of MAC address data provided from the communicable-machine notification information acquirer 115 (step S109). The checker 116 then specifies, among the pieces of MAC address data acquired by the machine MAC address acquirer 114, a piece of MAC address data that matches one piece of the pieces of MAC address data provided from the communicable-machine notification information acquirer 115.

The operation authority setter 117 then generates operation authority information containing the piece of MAC address data on the machine operable via the terminal device 5 and the piece of user identification data provided from the verifier 112, on the basis of the piece of MAC address data specified by the checker 116 (step S110). The operation authority setter 117 then causes the generated operation authority information to be stored into the operation authority storage 133 and notifies the authority information notifier 118 of the operation authority information. The authority information notifier 118, when being notified by the operation authority setter 117 of the operation authority information, transmits authority information for notifying the user that the operation authority is granted to the user, to the source terminal device 5 that has transmitted the user information (step S111).

The operation information acquirer 119 then determines whether operation information is acquired from the terminal device 5 (step S112). When the operation information acquirer 119 determines that no operation information is acquired (NO in step S112), the process goes to step S101 again. In contrast, when the operation information acquirer 119 determines that operation information is acquired (YES in step S112), the operation information acquirer 119 notifies the machine controller 120 of the acquired operation information. The machine controller 120 then extracts a piece of user identification data and a piece of MAC address data on the machine 3 from the operation information provided from the operation information acquirer 119, and determines whether the user has the operation authority on the basis of the extracted piece of user identification data and piece of MAC address data (step S113). When the machine controller 120 determines that the user has no operation authority (NO in step S113), the process goes to step S101 again. In contrast, when the machine controller 120 determines that the user has the operation authority (YES in step S113), the machine controller 120 selects a piece of control data corresponding to the operation information from the pieces of control data stored in the control data storage 134 (step S114). The machine controller 120 then transmits the selected piece of control data to the machine 3 corresponding to the operation information (step S115). The process then goes to step S101 again.

As described above, in the control system according to the present embodiment, the checker 116 checks the pieces of MAC address data acquired directly from the machines 3 against the pieces of MAC address data contained in the communicable-machine notification information acquired from the terminal device 5, and specifies, among the pieces of MAC address data acquired directly from the machines 3 a piece of MAC address data that matches one piece of the pieces of MAC address data contained in the communicable-machine notification information. The operation authority setter 117 then generates operation authority information containing the piece of MAC address data on the machine 3 operable by the user via the terminal device 5 and the piece of user identification data, on the basis of the piece of MAC address data specified by the checker 116. This configuration allows only the machines 3 communicable with the terminal device 5 via the local network NW2 to be set as the machines 3 operable by the user via the terminal device 5. The configuration can thus prevent the machines 3 from being operated via a terminal device not connected to the local network NW2, for example. The configuration can therefore prevent the machines 3 from being subject to operations deviating from the user's intension via a terminal device not connected to the local network NW2 in a place distant from the machines 3, for example.

In an exemplary case where the machine 3 is transferred from one user to another user, the other user is expected to execute the above-mentioned user registration operation in the control system according to the present embodiment. This user registration operation updates the piece of user identification data, stored in the operation authority storage 133 in association with the piece of MAC address data on the transferred machine 3, to the piece of user identification data on the other user. The operation authority of the machine 3 can therefore be safely transferred from the one user to the other user.

Furthermore, the terminal device 5 according to the present embodiment includes the user information notifier 512 to transmit user information containing a piece of user identification data for identifying the user of the machines 3, to the cloud server 1. The verifier 112 of the cloud server 1 executes the process for verifying the user on the basis of the user information. Upon success of the verification by the verifier 112, the permission notifier 113 transmits, to the terminal device 5, permission information for notifying the user that the user is permitted to use the machines 3. The machine MAC address acquirer 516 of the terminal device 5, when acquiring the permission information from the cloud server 1, acquires pieces of MAC address data from the respective machines 3 via the local network NW2. This configuration can allow only the users preliminarily registered on the cloud server 1 to get the operation authority of the machines 3, and can therefore improve the security related to the operation authority of the machines 3.

Embodiment 2

In a control system according to the present embodiment, the second machine ID acquirer of the control device acquires, in addition to the pieces of first machine identification data, one or more pieces of second machine identification data, different from the first machine identification data, each for identifying a corresponding machine of the one or more machines in the local network. The first machine ID acquirer of the terminal device transmits, to each of the one or more machines, on the basis of the one or more pieces of the second machine identification data acquired by the second machine ID acquirer, first-machine-ID request information requesting the machine to transmit the piece of the first machine identification data, in order to acquire the piece of the first machine identification data from each of the one or more machines.

Figure 7:
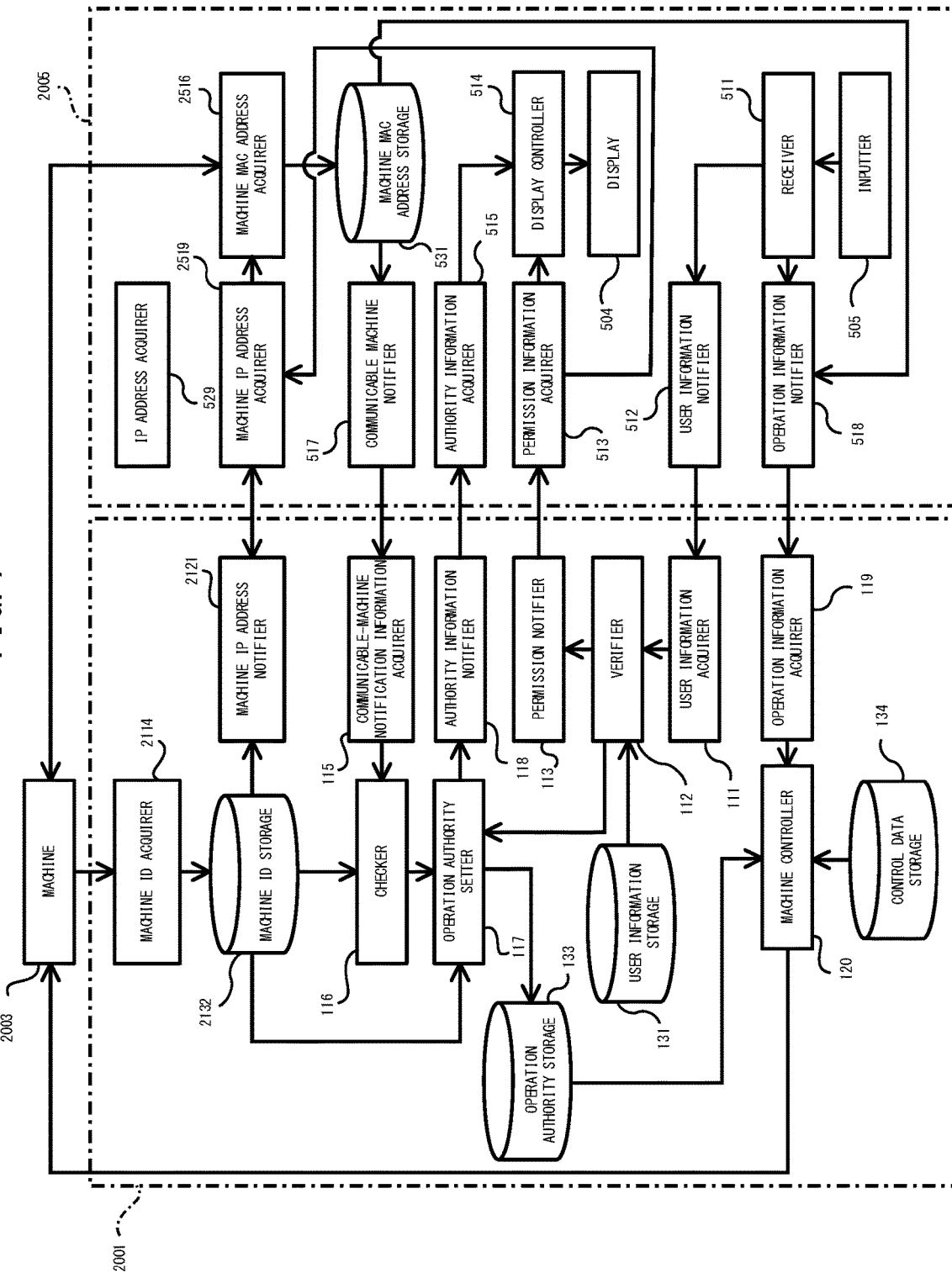
FIG. 7 is a block diagram illustrating a functional configuration of a control system according to Embodiment 2.

As illustrated in FIG. 7, a control system according to the present embodiment includes a cloud server 2001 and a terminal device 2005. In FIG. 7, the components identical to those in Embodiment 1 are provided with the same reference symbols as those in FIG. 3. The terminal device 2005 is connected to the wireless LAN established by the access point 41 installed inside the building H, as illustrated in FIG. 1 in Embodiment 1, and the access point 41 communicates with the BBR 42 via the local network NW2. The cloud server 2001 and the terminal device 2005 are connected to the wide area network NW1. The cloud server 2001 and the terminal device 2005 have hardware components identical to the hardware components of the cloud server 1 and the terminal device 5 in Embodiment 1. In the following description, the hardware components identical to those in Embodiment 1 are provided with the reference symbols illustrated in FIG. 2 as appropriate.

Multiple machines 2003 each include, in addition to the IP address acquirer 311, the ARP responder 312, and the MAC address notifier 313 in Embodiment 1, a non-illustrated machine ID notifier. The machine ID notifier, in response to acquisition of machine-ID request information from the cloud server 2001, transmits, to the cloud server 2001, the piece of MAC address data on the machine 2003 itself and the piece of IP address data indicating the private IP address assigned to the machine 2003 itself. Specifically, the machine ID notifier generates a piece of IP address data, in which the private IP address of the machine 2003 itself is set as the source IP address of the header and the private IP address of the machine 2003 itself is contained in the payload, and transmits the generated piece of IP address data to the BBR 42. When the BBR 42 acquires the piece of IP address data, the NAPT executor 413 converts the source IP address of the header of the piece of IP address data into the global IP address corresponding to the source machine 2003. The BBR 42 then transmits the piece of IP address data after conversion of the source IP address to the cloud server 2001. Specifically, the BBR 42 encrypts the payload of the piece of IP address data by means of a public key acquired from the cloud server 2001, for example, and then outputs the piece of IP address data to the wide area network NW1.

In the terminal device 2005, the CPU 501 loads the programs stored in the auxiliary storage 503 into the main storage 502 and executes the programs, and thereby functions as a receiver 511, a user information notifier 512, a permission information acquirer 513, a display controller 514, an authority information acquirer 515, a machine MAC address acquirer 2516, a communicable machine notifier 517, an operation information notifier 518, a machine IP address acquirer 2519, and an IP address acquirer 529. The auxiliary storage 503 includes a machine MAC address storage 531, as illustrated in FIG. 7.

The machine IP address acquirer 2519 transmits IP address request information to the cloud server 2001, and thereby acquires pieces of IP address data on the machines 2003 from the cloud server 2001. The IP address request information is information for requesting the cloud server 2001 to transmit the pieces of IP address data indicating the private IP addresses of the machines 2003 in the local network NW2. The IP address request information contains the piece of IP address data indicating the global IP address assigned to the source terminal device 2005 at the time of acquisition at the cloud server 2001. The machine IP address acquirer 2519, when being notified by the permission information acquirer 513 of the permission information, transmits IP address request information to the cloud server 2001, and thereby acquires the pieces of IP address data on the machines 2003 from the cloud server 2001. The machine IP address acquirer 2519 then notifies the machine MAC address acquirer 2516 of the pieces of IP address data acquired from the cloud server 2001.

The machine MAC address acquirer 2516 transmits MAC address request information to the machines 2003 on the basis of the private IP addresses of the machines 2003 in the local network NW2 indicated by the pieces of IP address data provided from the machine IP address acquirer 2519, and thereby acquires pieces of MAC address data from the machines 2003. The machine MAC address acquirer 2516, when being notified of the pieces of IP address data from the machine IP address acquirer 2519, transmits MAC address request information to the machines 2003 having the private IP addresses indicated by the provided pieces of IP address data, thereby acquires pieces of MAC address data from the machines 2003, and causes the acquired pieces of MAC address data to be stored into the machine MAC address storage 531.

In the cloud server 2001, the CPU 101 loads the programs stored in the auxiliary storage 103 into the main storage 102 and executes the programs, and thereby functions as a user information acquirer 111, a verifier 112, a permission notifier 113, a machine ID acquirer 2114, a communicable-machine notification information acquirer 115, a checker 116, an operation authority setter 117, an authority information notifier 118, an operation information acquirer 119, and a machine controller 120. The auxiliary storage 103 includes a user information storage 131, a machine ID storage 2132, an operation authority storage 133, and a control data storage 134. The machine ID storage 2132 stores pieces of model number data on the machines 2003, pieces of MAC address data, pieces of IP address data indicating the private IP addresses in the local network NW2, and pieces of IP address data indicating the global IP addresses in the wide area network NW1 in association with each other, for example, as illustrated in FIG. 8.

Referring back to FIG. 7, the machine ID acquirer 2114 acquires pieces of MAC address data indicating the MAC addresses of the respective machines 2003, and pieces of IP address data indicating the private IP addresses in the local network NW2 and the global IP addresses, from the respective machines 2003 via the wide area network NW1. In the case where the payloads of the pieces of IP address data are encrypted by means of a public key transmitted from the cloud server 2001 to the BBR 42, the machine ID acquirer 2114 decrypts the payloads by means of a secret key corresponding to the public key. The machine ID acquirer 2114 then causes the acquires pieces of MAC address data and pieces of IP address data to be stored into the machine ID storage 2132. In the case where the pieces of model number data on the machines 2003 are acquired from the respective machines 2003, the machine ID acquirer 2114 causes the acquired pieces of model number data to be stored into the machine ID storage 2132 in association with the pieces of MAC address data.

The machine IP address notifier 2121, when acquiring the IP address request information from the terminal device 2005, selects pieces of IP address data corresponding to the acquired IP address request information, from the pieces of IP address data indicating the private IP addresses stored in the machine ID storage 2132. Specifically, the machine IP address notifier 2121 selects pieces of IP address data indicating the private IP addresses of the machines 2003 associated with the global IP address identical to the global IP address of the source terminal device 2005 that has transmitted the IP address request information, for example. The machine IP address notifier 2121 then transmits the selected pieces of IP address data to the source terminal device 2005 that has transmitted the IP address request information.

Figure 9:
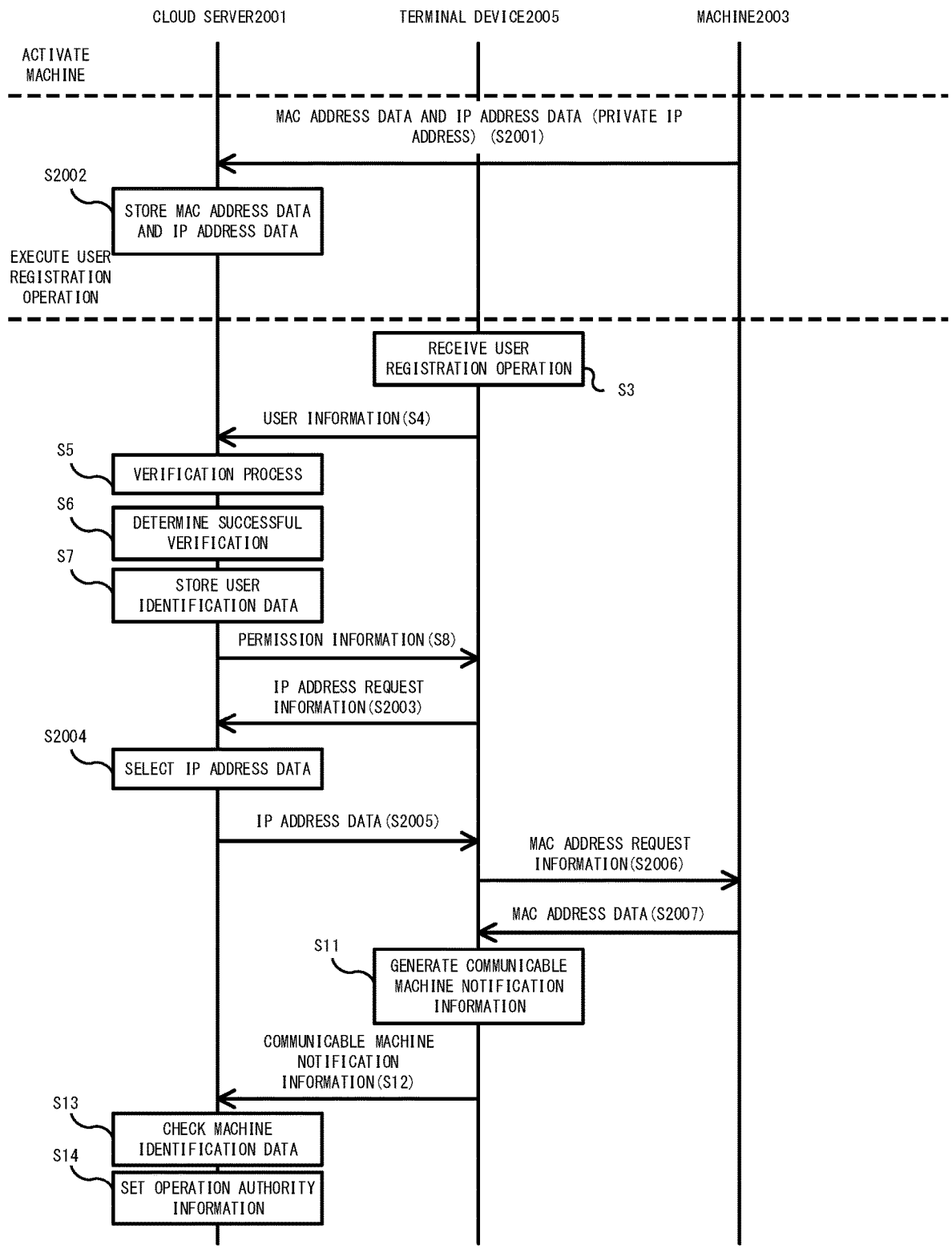
FIG. 9 is a sequence diagram illustrating an operation of the control system according to Embodiment 2.

An operation of the control system according to the present embodiment is described below with reference to FIG. 9. In FIG. 9, the steps identical to those in Embodiment 1 are provided with the same reference symbols as those in FIG. 5. The machine 2003, when being activated, transmits, to the cloud server 2001, a piece of MAC address data on the machine 2003 and a piece of IP address data indicating the private IP address of the machine 2003 in the local network NW2 (step S2001). The cloud server 2001, when acquiring the piece of MAC address data and the piece of IP address data, causes the acquired piece of MAC address data and piece of IP address data to be stored into the machine ID storage 2132 (step S2002).

The process then goes to the series of processing from steps S3 to S8, and then transmission from the terminal device 200 and terminal device 2005 to the cloud server 2001 is executed (step S2003). The cloud server 2001, when acquiring the IP address request information from the terminal device 2005, selects pieces of IP address data corresponding to the acquired IP address request information, from the pieces of IP address data indicating the private IP addresses stored in the machine ID storage 2132 (step S2004). The cloud server 2001 then transmits the selected pieces of IP address data to the terminal device 2005 (step S2005).

The terminal device 2005, when acquiring the pieces of IP address data from the cloud server 2001, transmits the above-mentioned MAC address request information to the machines 2003, on the basis of the private IP addresses of the machines 2003 in the local network NW2 indicated by the acquired pieces of IP address data (step S2006). The machines 2003, when acquiring the MAC address request information, transmit pieces of MAC address data indicating the MAC addresses of the machines 2003 to the terminal device 2005 (step S2007). The terminal device 2005 then causes the pieces of MAC address data acquired from the machines 2003 to be stored into the machine MAC address storage 531. The process then goes to step S11 and the following steps.

Figure 10:
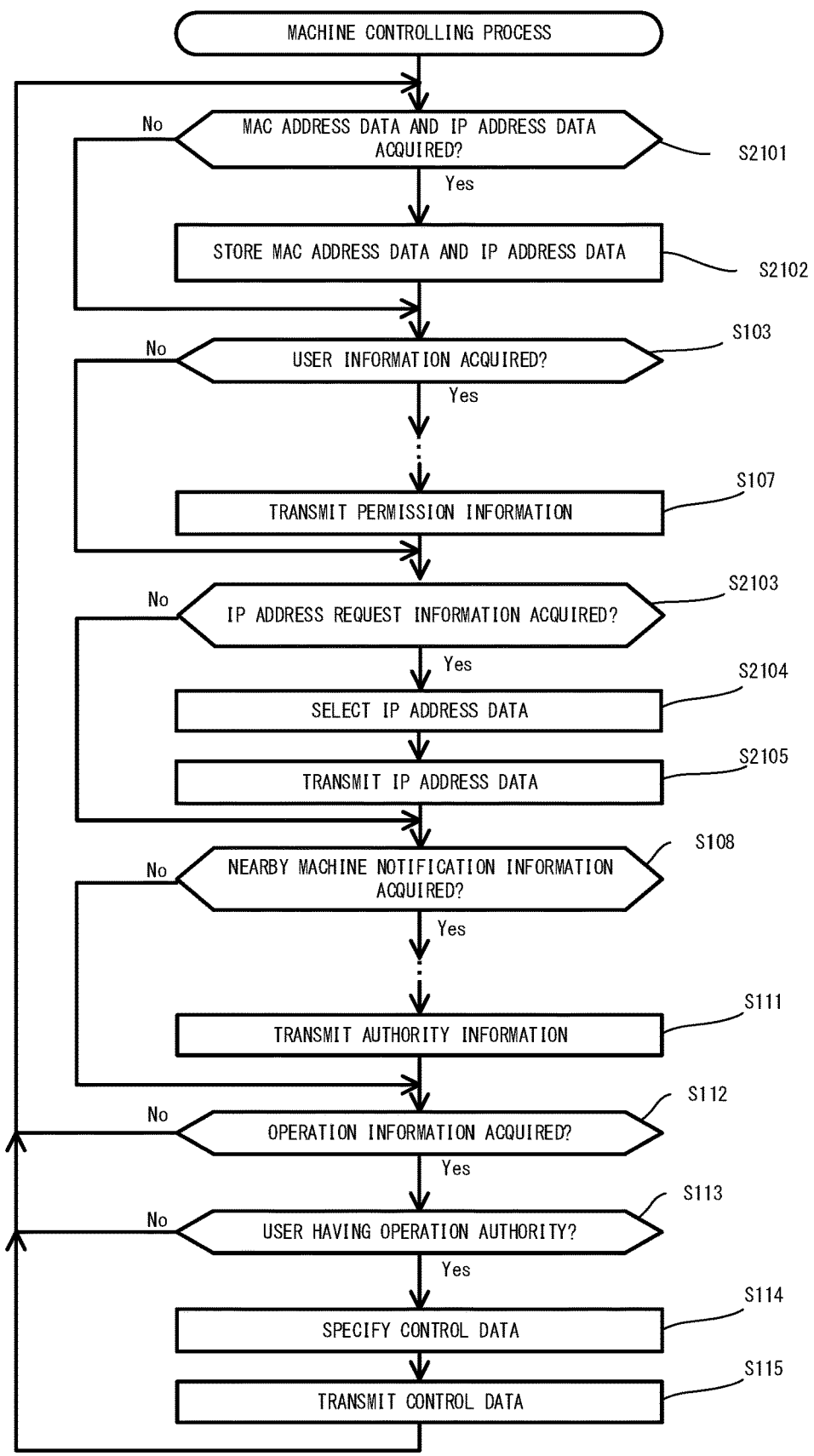
FIG. 10 is a flowchart illustrating an example of a machine controlling process executed in a cloud server according to Embodiment 2.

The cloud server 2001 according to the present embodiment executes a machine controlling process, which is described below with reference to FIG. 10. In FIG. 10, the steps identical to those in Embodiment 1 are provided with the same reference symbols as those in FIG. 6. First, the machine ID acquirer 2114 determines whether a piece of MAC address data and a piece of IP address data are acquired from the machine 2003 (step S2101). When the machine ID acquirer 2114 determines that none of the MAC address data and the IP address data is acquired from the machine 2003 (NO in step S2101), the process goes to step S103. In contrast, when the machine ID acquirer 2114 determines that a piece of MAC address data and a piece of IP address data are acquired from the machine 2003 (YES in step S2101), the machine ID acquirer 2114 causes the acquired piece of MAC address data and piece of IP address data to be stored into the machine ID storage 2132 (step S2102). The process then goes to the series of processing from steps S103 to S107.

The machine IP address notifier 2121 then determines whether IP address request information is acquired from the terminal device 2005 (step S2103). When the machine IP address notifier 2121 determines that no IP address request information is acquired (NO in step S2103), the process goes to step S108 and the following steps. In contrast, when the machine IP address notifier 2121 determines that IP address request information is acquired (YES in step S2103), the machine IP address notifier 2121 selects pieces of IP address data corresponding to the acquired IP address request information, from the pieces of IP address data indicating the private IP addresses and stored in the machine ID storage 2132 (step S2104). The machine IP address notifier 2121 then transmits the selected pieces of IP address data to the terminal device 2005 (step S2105). The process then goes to step S108 and the following steps.

Figure 11:
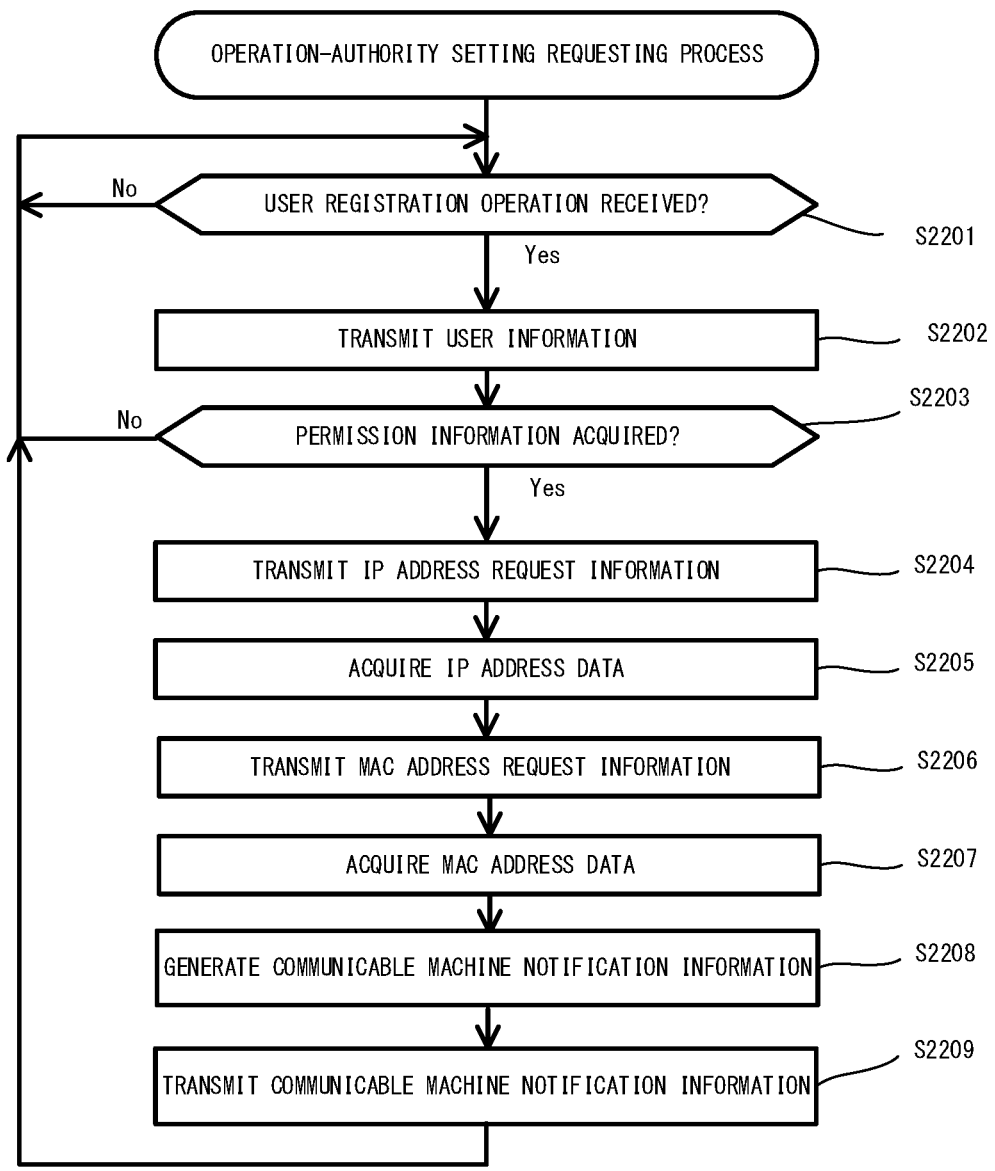
FIG. 11 is a flowchart illustrating an example of an operation-authority setting requesting process executed in a terminal device according to Embodiment 2.

The terminal device 2005 according to the present embodiment executes an operation-authority setting requesting process, which is described below with reference to FIG. 11. This operation-authority setting requesting process is started in response to activation of an application for operating the machines 2003 followed by energization of the terminal device 2005, for example. First, the receiver 511 determines whether a user registration operation is received from a user (step S2201). Unless a user registration operation is received (NO in step S2201), the receiver 511 repeats step S2201. When the receiver 511 determines that a user registration operation is received (YES in step S2201), the user information notifier 512 generates user information and transmits the generated user information to the cloud server 2001 (step S2202).

The permission information acquirer 513 then determines whether permission information is acquired from the cloud server 2001 (step S2203). When the permission information acquirer 513 determines that no permission information has been acquired from the cloud server 2001 for a predetermined waiting period, or determines that information indicating no permission is acquired (NO in step S2203), the process goes to step S2201 again. In contrast, when the permission information acquirer 513 determines that permission information is acquired from the cloud server 2001 (YES in step S2203), the permission information acquirer 513 notifies the machine IP address acquirer 2519 of the permission information. The machine IP address acquirer 2519 then transmits IP address request information to the cloud server 2001 (step S2204), and thereby acquires pieces of IP address data from the cloud server 2001 (step S2205). The pieces of IP address data acquired by the machine IP address acquirer 2519 indicate the private IP addresses of the machines 2003 in the local network NW2. The machine IP address acquirer 2519 notifies the machine MAC address acquirer 2516 of the acquired pieces of IP address data.

The machine MAC address acquirer 2516 then transmits MAC address request information to the machines 2003, on the basis of the private IP addresses of the machines 2003 in the local network NW2 indicated by the pieces of IP address data provided from the machine IP address acquirer 2519 (step S2206). The machine MAC address acquirer 2516 thereby acquires pieces of MAC address data from the machines 2003, which are the destinations of the MAC address request information (step S2207). The machine MAC address acquirer 2516 causes the acquired pieces of MAC address data to be stored into the machine MAC address storage 531.

The communicable machine notifier 517 then generates communicable-machine notification information that contains the pieces of MAC address data on the respective machines 2003 stored in the machine MAC address storage 531 (step S2208), and transmits the generated communicable-machine notification information to the cloud server 2001 (step S2209). The process then goes to step S2201 again.

As described above, in the control system according to the present embodiment, the machine ID acquirer 2114 of the cloud server 2001 acquires pieces of IP address data indicating the private IP addresses of the machines 2003 in the local network NW2, in addition to pieces of MAC address data on the machine 2003. The machine MAC address acquirer 2516 of the terminal device 2005 transmits MAC address request information to the machines 2003 on the basis of the pieces of IP address data indicating the private IP addresses of the machines 2003 acquired from the cloud server 2001, and thereby acquires pieces of MAC address data from the respective machines 2003. This configuration can grant the operation authority to the user owning the terminal device 2005, regarding only the machines 2003 connected to the local network NW2 to which the terminal device 2005 is connected. The configuration can therefore prevent the machines 2003 from being subject to operations deviating from the user's intension via a terminal device not connected to the local network NW2.

Embodiment 3

According to a control system according to the present embodiment, the control device includes a message notifier to transmit message information, for instructing a user of the terminal device to execute a preset registration operation for each of the one or more machines, to the terminal device upon acquisition of the above-mentioned communicable-machine notification information from the terminal device via the wide area network, and a machine operation information acquirer to acquire machine operation information containing one or more pieces of the first machine identification data on one or more machines for which the registration operation is executed. After elapse of a predetermined operation state determination period since transmission of the message information to the terminal device, the checker checks the one or more pieces of the first machine identification data contained in the communicable-machine notification information against the one or more pieces of the first machine identification data contained in the machine operation information acquired by the machine operation information acquirer, and specifies, among the one or more pieces of the first machine identification data contained in the communicable-machine notification information, a piece of first machine identification data that matches one piece of the one or more pieces of first machine identification data contained in the machine operation information.

Figure 12:
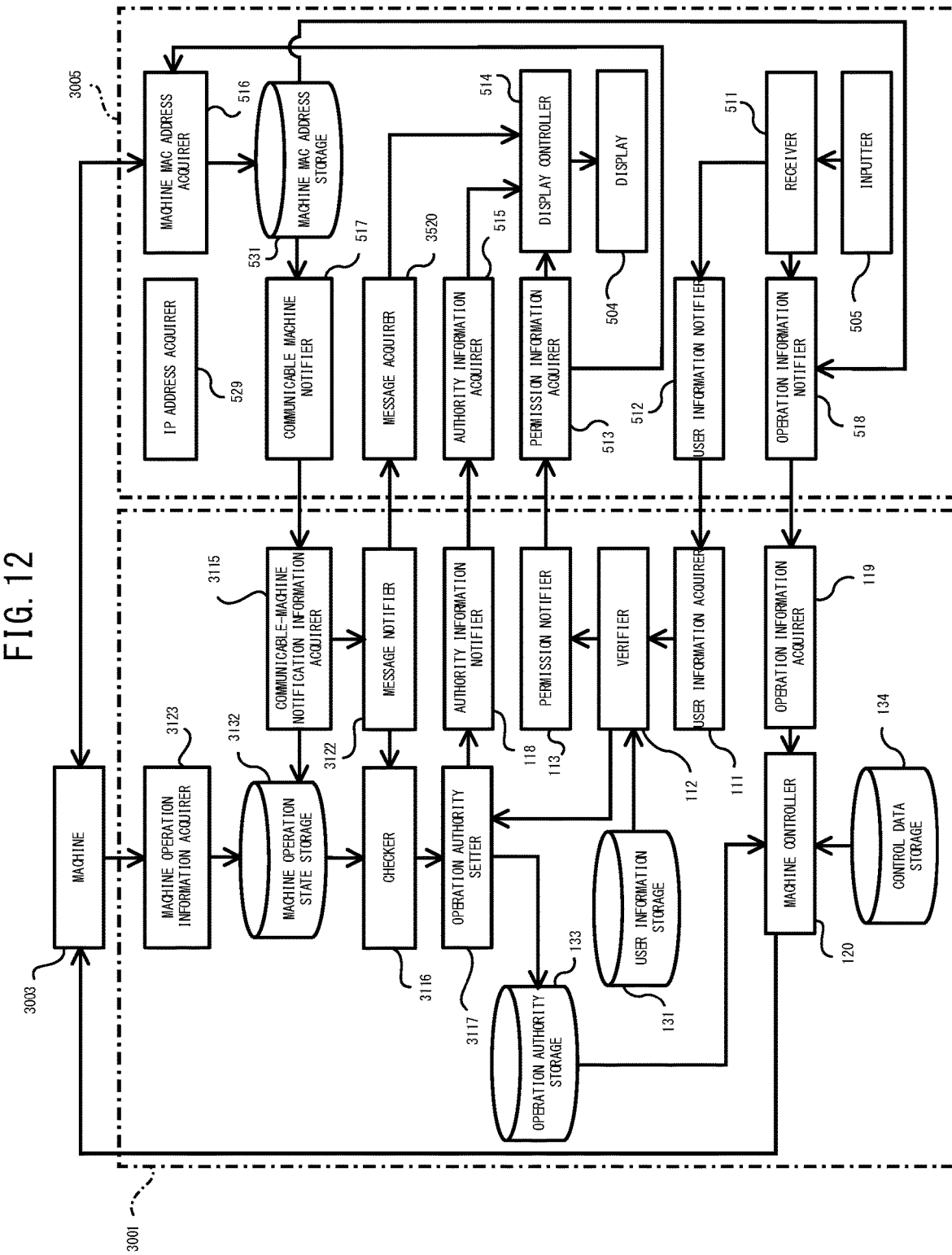
FIG. 12 is a block diagram illustrating a functional configuration of a control system according to Embodiment 3.

As illustrated in FIG. 12, a control system according to the present embodiment includes a cloud server 3001 and a terminal device 3005. In FIG. 12, the components identical to those in Embodiment 1 are provided with the same reference symbols as those in FIG. 3. The terminal device 3005 is connected to the wireless LAN established by the access point 41 installed inside the building H, as illustrated in FIG. 1 in Embodiment 1, and the access point 41 communicates with the BBR 42 via the local network NW2. The cloud server 3001 and the terminal device 3005 are connected to the wide area network NW1. The cloud server 3001 and the terminal device 3005 have hardware components identical to the hardware components of the cloud server 1 and the terminal device 5 in Embodiment 1. In the following description, the hardware components identical to those in Embodiment 1 are provided with the reference symbols illustrated in FIG. 2 as appropriate.

Multiple machines 3003 each include, in addition to the IP address acquirer 311, the ARP responder 312, and the MAC address notifier 313 in Embodiment 1, a non-illustrated machine operation information notifier to generate machine operation information containing the piece of MAC address data on the machine 3003 itself in response to an operation of an operating unit for operating the machine 3003, and transmit the generated machine operation information to the cloud server 3001.

In the terminal device 3005, the CPU 501 loads the programs stored in the auxiliary storage 503 into the main storage 502 and executes the programs, and thereby functions as a receiver 511, a user information notifier 512, a permission information acquirer 513, a display controller 514, an authority information acquirer 515, a machine MAC address acquirer 516, a communicable machine notifier 517, an operation information notifier 518, a message acquirer 3520, and an IP address acquirer 529. The auxiliary storage 503 includes a machine MAC address storage 531, as illustrated in FIG. 12.

The message acquirer 3520 acquires message information, for instructing the user of the terminal device 3005 to execute a preset registration operation regarding the respective machines 3003, from the cloud server 3001. The message acquirer 3520 then notifies the display controller 514 of the acquired message information. The display controller 514, when acquiring the message information from the message acquirer 3520, causes the display 504 to display the acquired message information.

Figure 13:
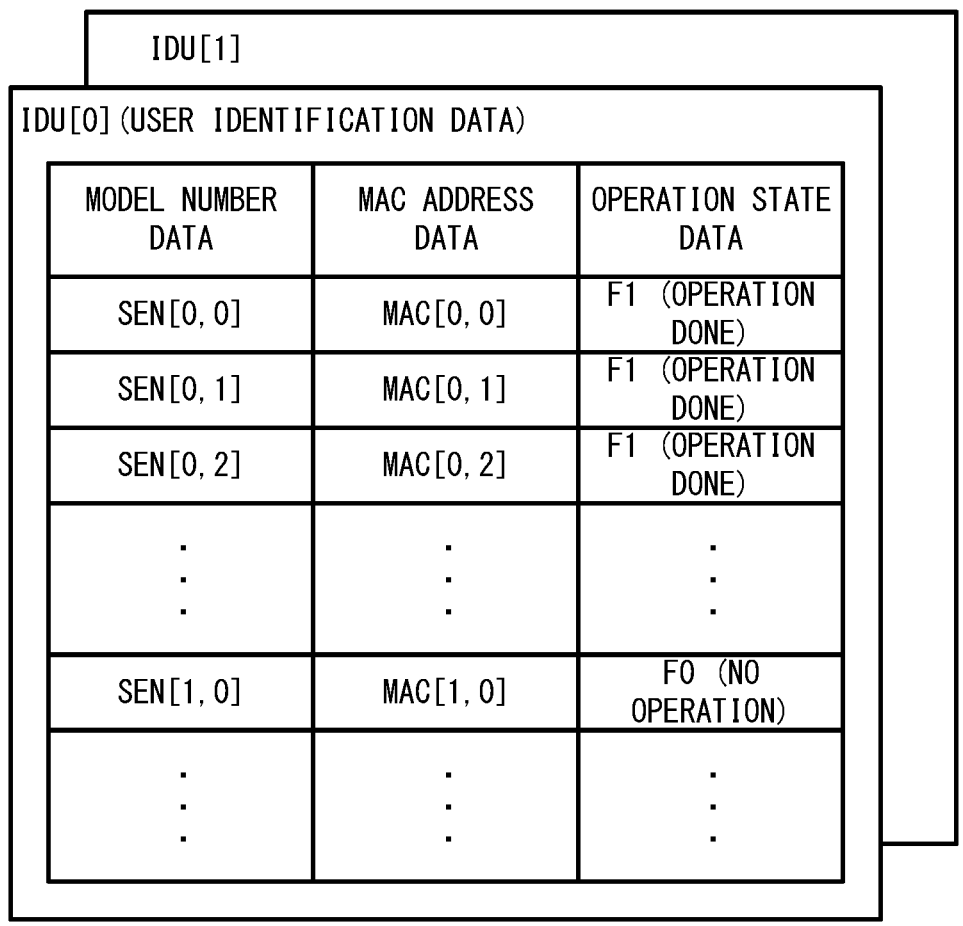
FIG. 13 illustrates an example of information stored in a machine operation state storage according to Embodiment 3.

In the cloud server 3001, the CPU 101 loads the programs stored in the auxiliary storage 103 into the main storage 102 and executes the programs, and thereby functions as a user information acquirer 111, a verifier 112, a permission notifier 113, a communicable-machine notification information acquirer 3115, a checker 3116, an operation authority setter 3117, an authority information notifier 118, an operation information acquirer 119, a machine controller 120, a message notifier 3122, and a machine operation information acquirer 3123. The auxiliary storage 103 includes a user information storage 131, a machine operation state storage 3132, an operation authority storage 133, and a control data storage 134. The machine operation state storage 3132 stores, for each piece of user identification data, pieces of model number data on the machines 3003, pieces of MAC address data, and pieces of operation state data indicating whether the above-mentioned registration operation is executed for the machines 3003, in association with each other, for example, as illustrated in FIG. 13.

Referring back to FIG. 12, the communicable-machine notification information acquirer 3115 acquires communicable-machine notification information from the terminal device 3005 via the wide area network NW1, and extracts the pieces of MAC address data on the machines 3003 from the acquired communicable-machine notification information. The communicable-machine notification information acquirer 3115 then causes the extracted pieces of MAC address data to be stored into the machine operation state storage 3132. Specifically, the communicable-machine notification information acquirer 3115 causes pieces of operation state data "F0" indicating that no registration operation is executed for the corresponding machines 3003 to be stored in association with the pieces of MAC address data. In the case where the communicable-machine notification information contains pieces of model number data on the machines 3003, the communicable-machine notification information acquirer 3115 extracts the pieces of model number data and causes the extracted pieces of model number data to be stored into the machine operation state storage 3132 in association with the pieces of MAC address data.

The message notifier 3122, upon the communicable-machine notification information acquirer 3115 acquiring the communicable-machine notification information, generates the above-mentioned message information and transmits the generated message information to the terminal device 3005. The machine operation information acquirer 3123 acquires, from each of the machines 3003 via the wide area network NW1, machine operation information containing the piece of MAC address data on the machine 3003. The machine operation information acquirer 3123, when acquiring the machine operation information, causes the pieces of MAC address data contained in the acquired machine operation information to be stored into the machine operation state storage 3132, and updates the corresponding pieces of operation state data to pieces of data "F1" indicating that a registration operation is executed.

The checker 3116 refers to the pieces of operation state data stored in the machine operation state storage 3132, and specifies pieces of MAC address data on the machines 3003 for which the registration operation is executed within a predetermined operation state determination period since transmission of the message information to the terminal device 3005. After elapse of the predetermined operation state determination period since transmission of the message information to the terminal device 3005, the checker 3116 checks the pieces of MAC address data contained in the communicable-machine notification information against the pieces of MAC address data contained in the machine operation information acquired by the machine operation information acquirer 3123. The checker 3116 then specifies, among the pieces of MAC address data contained in the communicable-machine notification information, a piece of MAC address data that matches one piece of the pieces of MAC address data contained in the machine operation information. The checker 3116 then notifies the operation authority setter 3117 of the specified piece of MAC address data. The operation authority setter 3117 generates operation authority information containing the piece of MAC address data specified by the checker 3116 and the piece of user identification data provided from the verifier 112, and causes the generated operation authority information to be stored into the operation authority storage 133.

Figure 14:
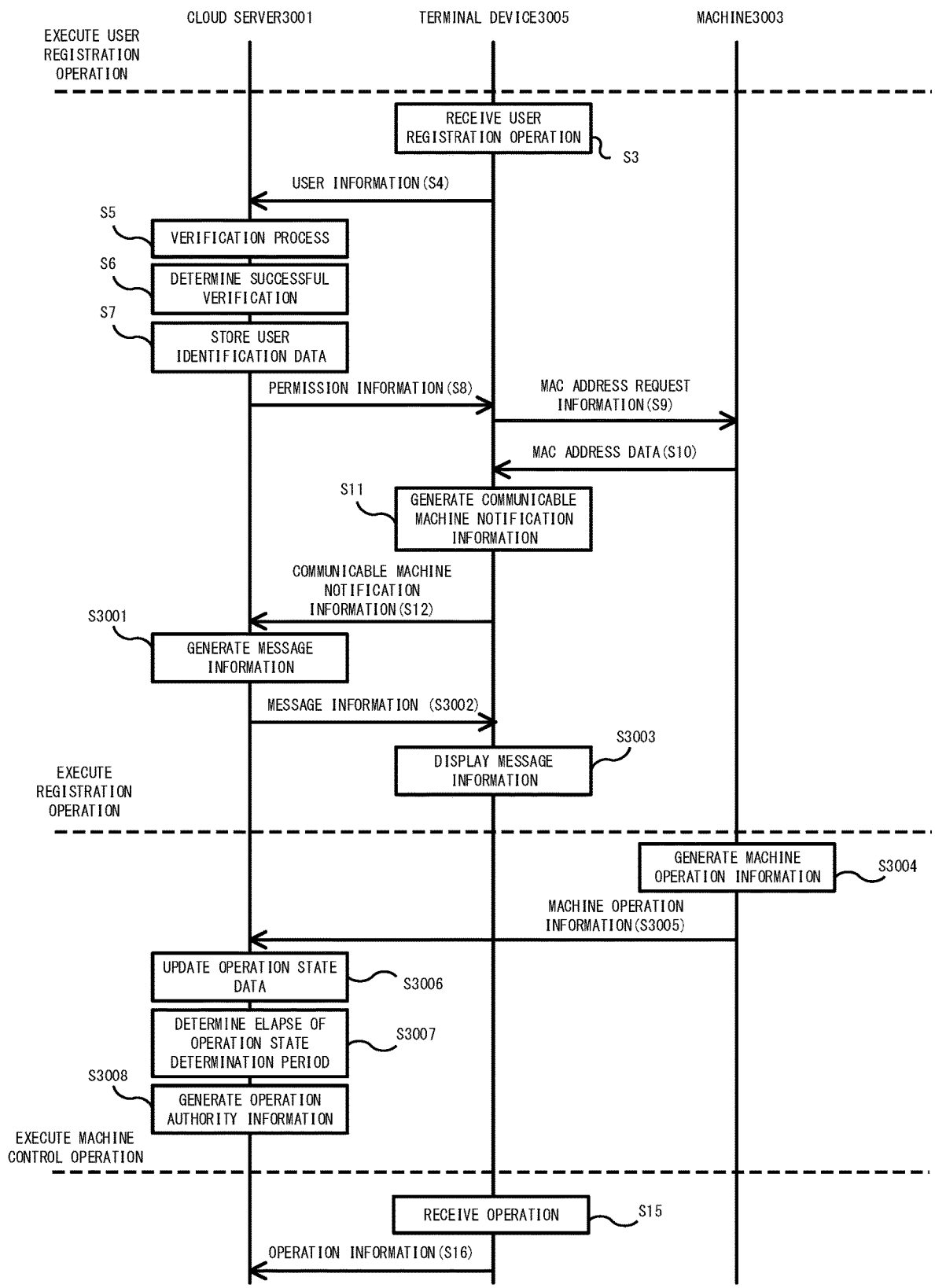
FIG. 14 is a sequence diagram illustrating an operation of the control system according to Embodiment 3.

An operation of the control system according to the present embodiment is described below with reference to FIG. 14. In FIG. 14, the steps identical to those in Embodiment 1 are provided with the same reference symbols as those in FIG. 5. The control system according to the present embodiment does not execute steps S1 and S2 in Embodiment 1. The control system first executes the series of processing from steps S3 to S12. The cloud server 3001, when acquiring the communicable-machine notification information from the terminal device 3005, generates message information for instructing the user of the terminal device 3005 to execute a preset registration operation regarding the respective machines 3003 (step S3001). The cloud server 3001 then transmits the generated message information to the terminal device 3005 (step S3002). The terminal device 3005, when acquiring the message information from the cloud server 3001, causes the display 504 to display the acquired message information (step S3003).

The following description assumes an exemplary case where the user executes a registration operation regarding the respective machines 3003 connected to the local network NW2 in accordance with the message information displayed on the display 504 of the terminal device 3005. In this case, the machines 3003 generate machine operation information indicating that the user executes a registration operation regarding the machines 3003 themselves (step S3004). The machines 3003 then transmit the generated machine operation information to the cloud server 3001 (step S3005). The cloud server 3001, when acquiring the machine operation information, causes the pieces of MAC address data contained in the acquired machine operation information to be stored into the machine operation state storage 3132, and updates the corresponding pieces of operation state data to pieces of data "F1" indicating that a registration operation is executed regarding the machines 3003 (step S3006). The cloud server 3001 then determines that the predetermined operation state determination period has elapsed since transmission of the message information to the terminal device 3005 (step S3007). In this case, the cloud server 3001 checks the pieces of MAC address data contained in the communicable-machine notification information against the pieces of MAC address data contained in the machine operation information acquired by the machine operation information acquirer 3123. The cloud server 3001 then specifies, among the pieces of MAC address data contained in the communicable-machine notification information, a piece of MAC address data that matches one piece of the pieces of MAC address data contained in the machine operation information, and generates operation authority information containing the specified piece of MAC address data and the piece of user identification data (step S3008). The cloud server 3001 then causes the generated operation authority information to be stored into the operation authority storage 133. The process then goes to step S15 and the following steps.

Figure 15:
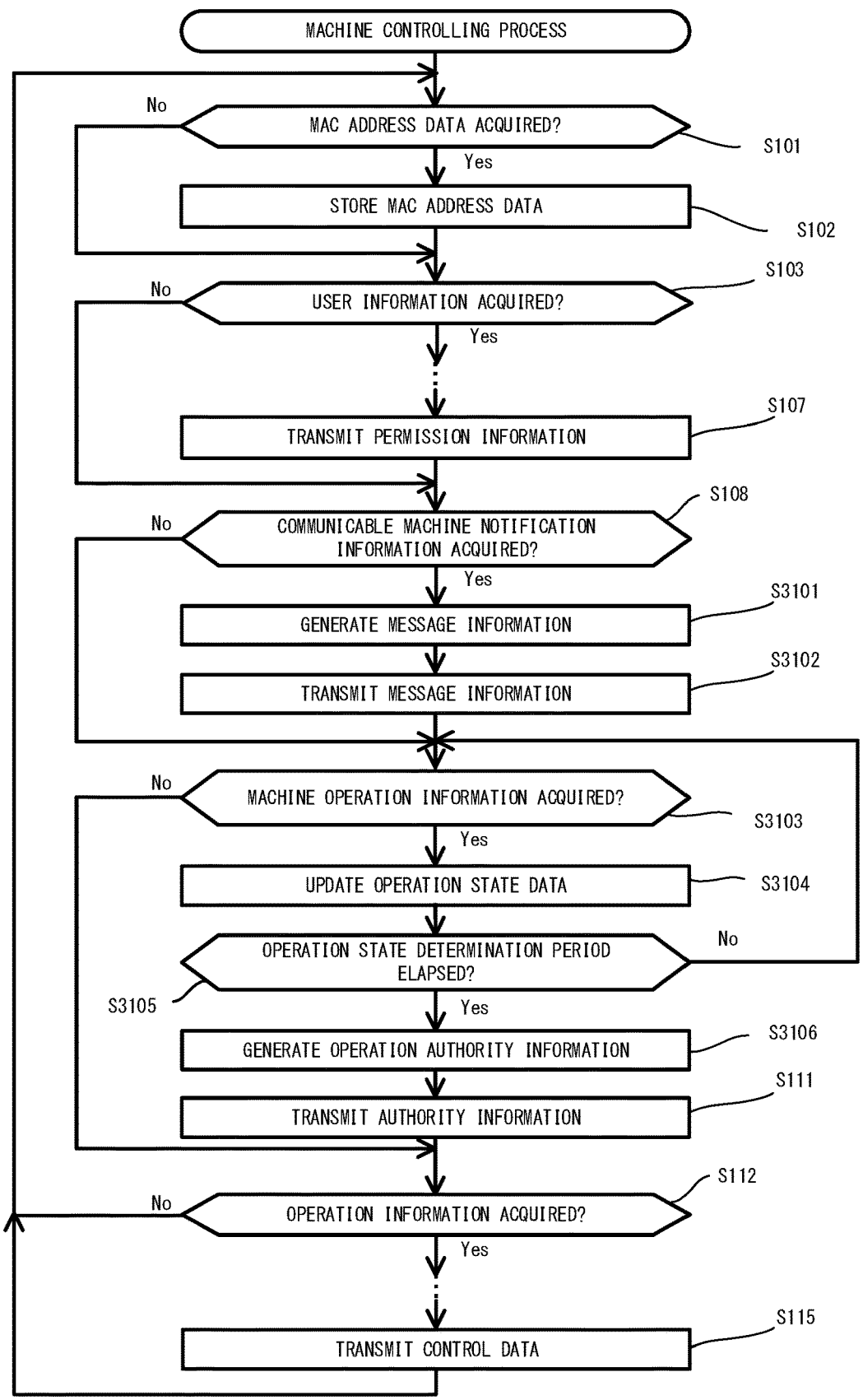
FIG. 15 is a flowchart illustrating an example of a machine controlling process executed in a cloud server according to Embodiment 3.

The cloud server 3001 according to the present embodiment executes a machine controlling process, which is described below with reference to FIG. 15. In FIG. 15, the steps identical to those in Embodiment 1 are provided with the same reference symbols as those in FIG. 6. First, after the series of processing from steps S101 to S107, the communicable-machine notification information acquirer 3115 determines whether communicable-machine notification information is acquired from the terminal device 3005 (step S108). When the communicable-machine notification information acquirer 3115 determines that no communicable-machine notification information is acquired (NO in step S108), the process goes to step S3103 described below. In contrast, when the communicable-machine notification information acquirer 3115 determines that communicable-machine notification information is acquired (YES in step S108), the communicable-machine notification information acquirer 3115 extracts pieces of MAC address data on the machines 3003 from the acquired communicable-machine notification information, and causes the extracted pieces of MAC address data to be stored into the machine operation state storage 3132. The message notifier 3122 then generates the above-mentioned message information (step S3101), and transmits the generated message information to the terminal device 3005 (step S3102).

The machine operation information acquirer 3123 then determines whether machine operation information is acquired from each of the machines 3003 that contains the piece of MAC address data on the machine 3003 (step S3103). When the machine operation information acquirer 3123 determines that no machine operation information is acquired (NO in step S3103), the process goes to step S112 and the following steps. In contrast, when the machine operation information acquirer 3123 determines that machine operation information is acquired (YES in step S3103), the machine operation information acquirer 3123 causes the pieces of MAC address data contained in the acquired machine operation information to be stored into the machine operation state storage 3132, and updates the corresponding pieces of operation state data to pieces of data "F1" indicating that a registration operation is executed (step S3104). The checker 3116 then determines whether the predetermined operation state determination period has elapsed since transmission of the message information to the terminal device 3005 (step S3105). When the checker 3116 determines that the operation state determination period has not elapsed yet (NO in step S3105), the process goes to step S3103 again. In contrast, when the checker 3116 determines that the operation state determination period has elapsed (YES in step S3105), the checker 3116 refers to the pieces of operation state data stored in the machine operation state storage 3132, specifies a piece of MAC address data on the machine 3003 regarding which a registration operation is executed, and notifies the operation authority setter 3117 of the specified piece of MAC address data. The operation authority setter 3117 then generates operation authority information containing the piece of MAC address data specified by the checker 3116 and the piece of user identification data provided from the verifier 112 (step S3106). The operation authority setter 3117 then causes the generated operation authority information to be stored into the operation authority storage 133. The authority information notifier 118, when being notified by the operation authority setter 3117 of the operation authority information, transmits authority information for notifying the user that the operation authority is granted to the user, to the source terminal device 3005 that has transmitted the user information (step S111). The process then goes to step S112 and the following steps.

As described above, in the control system according to the present embodiment, upon acquiring communicable-machine notification information from the terminal device 3005, the message notifier 3122 of the cloud server 3001 transmits, to the terminal device 3005, message information for instructing the user of the terminal device 3005 to execute a preset registration operation regarding the machines 3003. The machine operation information acquirer 3123 acquires machine operation information containing the pieces of MAC address data on the machines 3003 for which the registration operation is executed. After elapse of the operation state determination period since transmission of the message information to the terminal device 3005, the checker 3116 checks the pieces of MAC address data contained in the communicable-machine notification information against the pieces of MAC address data contained in the machine operation information acquired by the machine operation information acquirer 3123, and specifies, among the pieces of MAC address data contained in the communicable-machine notification information, a piece of MAC address data that matches one piece of the pieces of MAC address data contained in the machine operation information. This configuration can grant the operation authority to the user owning the terminal device 3005 regarding only the machines 3003 installed in a place operable by the user. The configuration can therefore prevent the machines 3003 from being subject to operations deviating from the user's intension.

The above-described embodiments of the present disclosure are not to be construed as limiting the scope of the present disclosure. For example, the operation authority of a single machine 3 may be granted to multiple users. In this case, the operation authority storage 133 stores a piece of MAC address data on each of the machines 3 in association with multiple pieces of user identification data. The operation authority setter 117 accordingly generates operation authority information containing multiple pieces of user identification data in association with the piece of MAC address data on the same machine 3, and causes the generated operation authority information to be stored into the operation authority storage 133.

Although the first machine identification data corresponds to the MAC address data on the machine 3 in the above-described embodiments, this configuration is a mere example. Alternatively, the first machine identification data may be identification data unique to each of the machines 3, such as serial number data on the machine 3, for example.

Although the terminal device 5 communicates with the machines 3 via the local network NW2, using a communication protocol comprising UDP in a transport layer in the above-described embodiments, this configuration is a mere example. Alternatively, the terminal device 5 may communicate with the machines 3 by a communication scheme comprising another connectionless communication protocol in a transport layer.

The functions of the cloud servers 1, 2001, and 3001 and the terminal devices 5, 2005, and 3005 according to the present disclosure can be performed by not only dedicated systems but also ordinary computer systems. For example, the programs for executing the operations in the above-described embodiments may be stored in non-transitory computer-readable recording mediums, such as compact disc read-only memories (CD-ROMs), for distribution and then installed in the computer systems, so as to configure the cloud servers 1, 2001, and 3001 and the terminal devices 5, 2005, and 3005 for executing the operations.

The programs may be provided to the computers by any procedure. For example, the programs may be uploaded on a bulletin board system (BBS) on a communication network and may be distributed to computers via the network. The computers may activate these programs and execute the programs under the control of an operating system (OS) in the same manner as the other applications. These computers accordingly function as the cloud servers 1, 2001, and 3001 and the terminal devices 5, 2005, and 3005 for executing the above operations.

The above-described embodiments and modifications of the present disclosure are not to be construed as limiting the scope of the present disclosure. The scope of the present disclosure encompasses any appropriate combination of the embodiments and the modifications and any appropriate variation to the embodiments and the modifications.

INDUSTRIAL APPLICABILITY

The present disclosure is suitable for a control system for controlling multiple machines via a terminal device.

The invention claimed is:

1. A control system comprising:
a terminal device capable of communicating with one or more machines via a local network; and
a control device capable of communicating with the one or more machines and the terminal device via a wide area network, the control device being configured to control the one or more machines based on operation information transmitted from the terminal device,
the terminal device including first processing circuitry to
acquire, from each of the one or more machines via the local network, a piece of first machine identification data identifying the machine in the local network, and
generate communicable-machine notification information containing one or more pieces of the first machine identification data on, among the one or more machines, one or more machines that are communicable with the terminal device via the local network, and transmit the generated communicable-machine notification information to the control device,
the control device including second processing circuitry to
acquire, from the one or more machines via the wide area network, one or more pieces of the first machine identification data on the one or more machines,
acquire the communicable-machine notification information from the terminal device via the wide area network,
check the acquired one or more pieces of the first machine identification data against the one or more pieces of the first machine identification data contained in the communicable-machine notification information, and specify, among the acquired one or more pieces of the first machine identification data, a piece of the first machine identification data that matches one piece of the one or more pieces of the first machine identification data contained in the communicable-machine notification information, and
generate, based on the specified piece of the first machine identification data, operation authority information containing the piece of the first machine identification data on a machine operable via the terminal device, wherein
the second processing circuitry acquires, in addition to the one or more pieces of the first machine identification data, one or more pieces of second machine identification data different from the first machine identification data, each of the one or more pieces of the second machine identification data identifying a corresponding machine of the one or more machines in the local network, and
the first processing circuitry transmits, to each of the one or more machines, based on the one or more pieces of the second machine identification data, first-machine-ID request information requesting the machine to transmit the piece of the first machine identification data, to acquire the piece of the first machine identification data from each of the one or more machines.

2. The control system according to claim 1, wherein the piece of the second machine identification data indicates a private IP address in the local network.

3. The control system according to claim 1, wherein each of the one or more pieces of the first machine identification data indicates an MAC address of a corresponding machine of the one or more machines.

4. The control system according to claim 1, wherein
the first processing circuitry transmits
user information to the control device, the user information containing a piece of user identification data for identifying a user of the one or more machines,
the second processing circuitry
executes a process for verifying the user based on the user information, and
transmits permission information to the terminal device upon success of verification, the permission information indicating permission to use the one or more machines, and
upon the terminal device acquiring the permission information from the control device, the first processing circuitry acquires the piece of the first machine identification data from each of the one or more machines via the local network.

5. The control system according to claim 1, wherein a communication protocol comprising UDP in a transport layer is used for communication between the terminal device and the one or more machines via the local network.

6. A control system comprising:
a terminal device capable of communicating with one or more machines via a local network; and
a control device capable of communicating with the one or more machines and the terminal device via a wide area network, the control device being configured to control the one or more machines based on operation information transmitted from the terminal device,
the terminal device including first processing circuitry to
acquire, from each of the one or more machines via the local network, a piece of first machine identification data identifying the machine in the local network, and
generate communicable-machine notification information containing one or more pieces of the first machine identification data on, among the one or more machines, one or more machines that are communicable with the terminal device via the local network, and transmit the generated communicable-machine notification information to the control device,
the control device including second processing circuitry to
acquire, from the one or more machines via the wide area network, one or more pieces of the first machine identification data on the one or more machines,
acquire the communicable-machine notification information from the terminal device via the wide area network,
transmit message information to the terminal device upon acquisition of the communicable-machine notification information from the terminal device via the wide area network, the message information instructing a user of the terminal device to execute a preset registration operation for each of the one or more machines,
acquire machine operation information containing one or more pieces of the first machine identification data on one or more machines for which the registration operation is executed,
check, after elapse of a predetermined operation state determination period since transmission of the message information to the terminal device, the one or more pieces of the first machine identification data contained in the communicable-machine notification information against the one or more pieces of the first machine identification data contained in the acquired machine operation information, and specify, among the one or more pieces of the first machine identification data contained in the communicable-machine notification information, a piece of the first machine identification data that matches one piece of the one or more pieces of the first machine identification data contained in the machine operation information, and
generate, based on the piece of the specified first machine identification data, operation authority information containing the piece of the first machine identification data on a machine operable via the terminal device.

7. The control system according to claim 6, wherein
the first processing circuitry transmits user information to the control device, the user information containing a piece of user identification data for identifying a user of the one or more machines,
the second processing circuitry
executes a process for verifying the user based on the user information, and
transmits permission information to the terminal device upon success of verification, the permission information indicating permission to use the one or more machines, and
upon the terminal device acquiring the permission information from the control device, the first processing circuitry acquires the piece of the first machine identification data from each of the one or more machines via the local network.

8. A control device capable of communicating with one or more machines and a terminal device via a wide area network, the terminal device being capable of communicating with the one or more machines via a local network, the control device being configured to control the one or more machines based on operation information transmitted from the terminal device, the control device comprising:
processing circuitry to
acquire, from the one or more machines via the wide area network, one or more pieces of first machine identification data each identifying a corresponding machine of the one or more machines in the local network and one or more pieces of second machine identification data different from the first machine identification data, each of the one or more pieces of the second machine identification data identifying a corresponding machine of the one or more machines in the local network,
acquire communicable-machine notification information from the terminal device via the wide area network, the communicable-machine notification information containing one or more pieces of the first machine identification data on, among the one or more machines, one or more machines that are communicable with the terminal device via the local network,
check the acquired one or more pieces of the first machine identification data against the one or more pieces of the first machine identification data contained in the communicable-machine notification information, and specify, among the acquired one or more pieces of the first machine identification data, a piece of the first machine identification data that matches one piece of the one or more pieces of the first machine identification data contained in the communicable-machine notification information, and
generate, based on the piece of the specified first machine identification data, operation authority information containing the piece of the first machine identification data on a machine operable via the terminal device, wherein
the terminal device transmits, to each of the one or more machines, based on the one or more pieces of the second machine identification data, first-machine-ID request information requesting the machine to transmit the piece of the first machine identification data, to acquire the piece of the first machine identification data from each of the one or more machines.

9. A machine control method for controlling, by using a terminal device capable of communicating with one or more machines via a local network, the one or more machines based on operation information transmitted from the terminal device, the machine control method comprising:
acquiring, by the terminal device, from each of the one or more machines via the local network, a piece of first machine identification data identifying the machine in the local network;
generating, by the terminal device, communicable-machine notification information containing one or more pieces of the first machine identification data on, among the one or more machines, one or more machines that are communicable with the terminal device via the local network, and transmitting, by the terminal device, the generated communicable-machine notification information to a control device, the control device being configured to control the one or more machines based on the operation information transmitted from the terminal device;
acquiring, by the control device, from the one or more machines via the wide area network, one or more pieces of the first machine identification data on the one or more machines and one or more pieces of second machine identification data different from the first machine identification data, each of the one or more pieces of the second machine identification data identifying a corresponding machine of the one or more machines in the local network;
acquiring, by the control device, the communicable-machine notification information from the terminal device via the wide area network;
checking, by the control device, the one or more pieces of the first machine identification data acquired from the one or more machines against the one or more pieces of the first machine identification data contained in the communicable-machine notification information, and specifying, by the control device, among the one or more pieces of the first machine identification data acquired from the one or more machines, a piece of the first machine identification data that matches one piece of the one or more pieces of the first machine identification data contained in the communicable-machine notification information;
generating, by the control device, based on the specified piece of the first machine identification data, operation authority information containing the piece of the first machine identification data on a machine operable via the terminal device; and
transmitting, by the terminal device, to each of the one or more machines, based on the one or more pieces of the second machine identification data, first-machine-ID request information requesting the machine to transmit the piece of the first machine identification data, to acquire the piece of the first machine identification data from each of the one or more machines.

10. A non-transitory recording medium storing a program for causing a computer to:
acquire, from one or more machines via a wide area network, one or more pieces of first machine identification data each identifying a corresponding machine of the one or more machines in a local network and one or more pieces of second machine identification data different from the first machine identification data, each of the one or more pieces of the second machine identification data identifying a corresponding machine of the one or more machines in the local network;
acquire communicable-machine notification information via the wide area network from a terminal device capable of communicating with the one or more machines via the local network, the communicable-machine notification information containing one or more pieces of the first machine identification data on, among the one or more machines, one or more machines that are communicable with the terminal device via the local network;
check the acquired one or more pieces of the first machine identification data against the one or more pieces of the first machine identification data contained in the communicable-machine notification information, and specify, among the acquired one or more pieces of the first machine identification data, a piece of the first machine identification data that matches one piece of the one or more pieces of the first machine identification data contained in the communicable-machine notification information; and
generate, based on the piece of the specified first machine identification data, operation authority information containing the piece of the first machine identification data on a machine operable via the terminal device, wherein
the terminal device transmits, to each of the one or more machines, based on the one or more pieces of the second machine identification data, first-machine-ID request information requesting the machine to transmit the piece of the first machine identification data, to acquire the piece of the first machine identification data from each of the one or more machines.

11. A control system comprising:
a terminal device capable of communicating with one or more machines via a local network; and
a control device capable of communicating with the one or more machines and the terminal device via a wide area network, the control device being configured to control the one or more machines based on operation information transmitted from the terminal device,
the terminal device including first processing circuitry to
acquire, from each of the one or more machines via the local network, a piece of first machine identification data identifying the machine in the local network, and
generate communicable-machine notification information containing one or more pieces of the first machine identification data on, among the one or more machines, one or more machines that are communicable with the terminal device via the local network, and transmit the generated communicable-machine notification information to the control device,
the control device including second processing circuitry to
preliminarily acquire, from the one or more machines via the wide area network, one or more pieces of the first machine identification data on the one or more machines,
after acquiring the one or more pieces of the first machine identification data, acquire the communicable-machine notification information from the terminal device via the wide area network,
check the acquired one or more pieces of the first machine identification data against the one or more pieces of the first machine identification data contained in the communicable-machine notification information, and specify, among the acquired one or more pieces of the first machine identification data, a piece of the first machine identification data that matches one piece of the one or more pieces of the first machine identification data contained in the communicable-machine notification information, and generate, based on the specified piece of the first machine identification data, operation authority information containing the piece of the first machine identification data on a machine operable via the terminal device.

12. The control system according to claim 11, wherein each of the one or more pieces of the first machine identification data indicates an MAC address of a corresponding machine of the one or more machines.

13. The control system according to claim 11, wherein the first processing circuitry transmits user information to the control device, the user information containing a piece of user identification data for identifying a user of the one or more machines, the second processing circuitry executes a process for verifying the user based on the user information, and transmits permission information to the terminal device upon success of verification, the permission information indicating permission to use the one or more machines, and upon the terminal device acquiring the permission information from the control device, the first processing circuitry acquires the piece of the first machine identification data from each of the one or more machines via the local network.

14. A control device capable of communicating with one or more machines and a terminal device via a wide area network, the terminal device being capable of communicating with the one or more machines via a local network, the control device being configured to control the one or more machines based on operation information transmitted from the terminal device, the control device comprising:

processing circuitry to preliminarily acquire, from the one or more machines via the wide area network, one or more pieces of first machine identification data each identifying a corresponding machine of the one or more machines in the local network, after acquiring the one or more pieces of the first machine identification data, acquire, from the terminal device via the wide area network, communicable-machine notification information containing one or more pieces of the first machine identification data on, among the one or more machines, one or more machines that are communicable with the terminal device via the local network, check the acquired one or more pieces of the first machine identification data against the one or more pieces of the first machine identification data contained in the communicable-machine notification information, and specify, among the acquired one or more pieces of the first machine identification data, a piece of the first machine identification data that matches one piece of the one or more pieces of the first machine identification data contained in the communicable-machine notification information, and generate, based on the specified piece of the first machine identification data, operation authority information containing the piece of the first machine identification data on a machine operable via the terminal device.

15. A control device capable of communicating with one or more machines and a terminal device via a wide area network, the terminal device being capable of communicating with the one or more machines via a local network, the control device being configured to control the one or more machines based on operation information transmitted from the terminal device, the control device comprising:

processing circuitry to acquire, from the one or more machines via the wide area network, one or more pieces of first machine identification data each identifying a corresponding machine of the one or more machines in the local network, acquire communicable-machine notification information from the terminal device via the wide area network, the communicable-machine notification information containing one or more pieces of the first machine identification data on, among the one or more machines, one or more machines that are communicable with the terminal device via the local network, transmit message information to the terminal device upon acquisition of the communicable-machine notification information from the terminal device via the wide area network, the message information instructing a user of the terminal device to execute a preset registration operation for each of the one or more machines, acquire machine operation information containing one or more pieces of the first machine identification data on one or more machines for which the registration operation is executed, check, after elapse of a predetermined operation state determination period since transmission of the message information to the terminal device, the one or more pieces of the first machine identification data contained in the communicable-machine notification information against the one or more pieces of the first machine identification data contained in the acquired machine operation information, and specify, among the one or more pieces of the first machine identification data contained in the communicable-machine notification information, a piece of the first machine identification data that matches one piece of the one or more pieces of the first machine identification data contained in the machine operation information, and generate, based on the piece of the specified first machine identification data, operation authority information containing the piece of the first machine identification data on a machine operable via the terminal device.

16. A machine control method for controlling, by using a terminal device capable of communicating with one or more machines via a local network, the one or more machines based on operation information transmitted from the terminal device, the machine control method comprising:

acquiring, by the terminal device, from each of the one or more machines via the local network, a piece of first machine identification data identifying the machine in the local network;

generating, by the terminal device, communicable-machine notification information containing one or more pieces of the first machine identification data on, among the one or more machines, one or more machines that are communicable with the terminal device via the local network, and transmitting, by the terminal device, the generated communicable-machine notification information to a control device, the control device being configured to control the one or more machines based on the operation information transmitted from the terminal device;

preliminarily acquiring, by the control device, from the one or more machines via a wide area network, one or more pieces of the first machine identification data on the one or more machines;

after acquiring the one or more pieces of the first machine identification data, acquiring, by the control device, the communicable-machine notification information from the terminal device via the wide area network;

checking, by the control device, the one or more pieces of the first machine identification data acquired from the one or more machines against the one or more pieces of the first machine identification data contained in the communicable-machine notification information, and specifying, by the control device, among the one or more pieces of the first machine identification data acquired from the one or more machines, a piece of the first machine identification data that matches one piece of the one or more pieces of the first machine identification data contained in the communicable-machine notification information; and generating, by the control device, based on the specified piece of the first machine identification data, operation authority information containing the piece of the first machine identification data on a machine operable via the terminal device.

17. A machine control method for controlling, by using a terminal device capable of communicating with one or more machines via a local network, the one or more machines based on operation information transmitted from the terminal device, the machine control method comprising:

acquiring, by the terminal device, from each of the one or more machines via the local network, a piece of first machine identification data identifying the machine in the local network;

generating, by the terminal device, communicable-machine notification information containing one or more pieces of the first machine identification data on, among the one or more machines, one or more machines that are communicable with the terminal device via the local network, and transmitting, by the terminal device, the generated communicable-machine notification information to a control device, the control device being configured to control the one or more machines based on the operation information transmitted from the terminal device;

acquiring, by the control device, from the one or more machines via a wide area network, one or more pieces of the first machine identification data on the one or more machines;

acquiring, by the control device, the communicable-machine notification information from the terminal device via the wide area network;

transmitting, by the control device, message information to the terminal device upon acquisition of the communicable-machine notification information from the terminal device via the wide area network, the message information instructing a user of the terminal device to execute a preset registration operation for each of the one or more machines;

acquiring, by the control device, machine operation information containing one or more pieces of the first machine identification data on one or more machines for which the registration operation is executed;

checking, by the control device, after elapse of a predetermined operation state determination period since transmission of the message information to the terminal device, the one or more pieces of the first machine identification data contained in the communicable-machine notification information against the one or more pieces of the first machine identification data contained in the acquired machine operation information, and specifying, by the control device, among the one or more pieces of the first machine identification data contained in the communicable-machine notification information, a piece of the first machine identification data that matches one piece of the one or more pieces of the first machine identification data contained in the machine operation information; and generating, by the control device, based on the piece of the specified first machine identification data, operation authority information containing the piece of the first machine identification data on a machine operable via the terminal device.

18. A non-transitory recording medium storing a program for causing a computer to:

preliminarily acquire, from one or more machines via a wide area network, one or more pieces of first machine identification data each identifying a corresponding machine of the one or more machines in a local network;

after acquiring the one or more pieces of the first machine identification data, acquire communicable-machine notification information via the wide area network from a terminal device capable of communicating with the one or more machines via the local network, the communicable-machine notification information containing one or more pieces of the first machine identification data on, among the one or more machines, one or more machines that are communicable with the terminal device via the local network;

check the acquired one or more pieces of the first machine identification data against the one or more pieces of the first machine identification data contained in the communicable-machine notification information; and specify, among the acquired one or more pieces of the first machine identification data, a piece of the first machine identification data that matches one piece of the one or more pieces of the first machine identification data contained in the communicable-machine notification information; and generate, based on the specified piece of the first machine identification data, operation authority information containing the piece of the first machine identification data on a machine operable via the terminal device.

19. A non-transitory recording medium storing a program for causing a computer to:

acquire, from one or more machines via a wide area network, one or more pieces of first machine identification data each identifying a corresponding machine of the one or more machines in a local network;

acquire communicable-machine notification information via the wide area network from a terminal device capable of communicating with the one or more machines via the local network, the communicable-machine notification information containing one or more pieces of the first machine identification data on, among the one or more machines, one or more machines that are communicable with the terminal device via the local network;
transmit message information to the terminal device upon acquisition of the communicable-machine notification information from the terminal device via the wide area network, the message information instructing a user of the terminal device to execute a preset registration operation for each of the one or more machines;
acquire machine operation information containing one or more pieces of the first machine identification data on one or more machines for which the registration operation is executed;
check, after elapse of a predetermined operation state determination period since transmission of the message information to the terminal device, the one or more pieces of the first machine identification data contained in the communicable-machine notification information against the one or more pieces of the first machine identification data contained in the acquired machine operation information, and specify, among the one or more pieces of the first machine identification data contained in the communicable-machine notification information, a piece of the first machine identification data that matches one piece of the one or more pieces of the first machine identification data contained in the machine operation information; and
generate, based on the piece of the specified first machine identification data, operation authority information containing the piece of the first machine identification data on a machine operable via the terminal device.

* * * * *